(12) United States Patent
Omori et al.

(10) Patent No.: US 9,961,227 B2
(45) Date of Patent: May 1, 2018

(54) LIGHT SOURCE DRIVE CONTROL DEVICE, IMAGE FORMING APPARATUS, LIGHT SOURCE DRIVE CONTROL METHOD, AND COMPUTER PROGRAM PRODUCT

(71) Applicants: Atsufumi Omori, Kanagawa (JP); Masaaki Ishida, Kanagawa (JP); Muneaki Iwata, Kanagawa (JP); Hayato Fujita, Kanagawa (JP)

(72) Inventors: Atsufumi Omori, Kanagawa (JP); Masaaki Ishida, Kanagawa (JP); Muneaki Iwata, Kanagawa (JP); Hayato Fujita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days. days.

(21) Appl. No.: 15/015,364

(22) Filed: Feb. 4, 2016

(65) Prior Publication Data
US 2016/0234399 A1     Aug. 11, 2016

(30) Foreign Application Priority Data
Feb. 9, 2015   (JP) ................................. 2015-023632

(51) Int. Cl.
*G06F 15/00* (2006.01)
*H04N 1/04* (2006.01)
(Continued)

(52) U.S. Cl.
CPC ....... *H04N 1/0446* (2013.01); *H04N 1/00822* (2013.01); *H04N 1/0408* (2013.01);
(Continued)

(58) Field of Classification Search
None
See application file for complete search history.

(56) References Cited

U.S. PATENT DOCUMENTS 6,498,617 B1   12/2002   Ishida et al.
8,237,760 B2    8/2012   Nihei et al.
(Continued)

FOREIGN PATENT DOCUMENTS

JP        3082645        6/2000
JP     2004-345220     12/2004
(Continued)

OTHER PUBLICATIONS

U.S. Appl. No. 14/948,867, filed Nov. 23, 2015.

*Primary Examiner* — Huo Long Chen
(74) *Attorney, Agent, or Firm* — Oblon, McClelland, Maier & Neustadt, L.L.P.

(57) ABSTRACT

A light source drive control device includes: an image data generating part that generates line-thinned image data having been subjected to line thinning processing for thinning an edge pixel in image data by a first pixel width; an intensity information generating part that generates intensity information including a first intensity at which a pixel not included in a set second pixel width of an edge in the line-thinned image data is exposed and a second intensity at which a pixel included in the second pixel width is exposed and which is higher than the first intensity; and a light source driving part that drives a light source based on a light source modulation signal generated according to the line-thinned image data and a drive current data switched based on a drive current switching signal generated based on the intensity information.

11 Claims, 15 Drawing Sheets

(51) Int. Cl.
   *H04N 1/00* (2006.01)
   *H04N 1/409* (2006.01)
   *H04N 1/40* (2006.01)

(52) U.S. Cl.
   CPC ....... *H04N 1/40037* (2013.01); *H04N 1/4092* (2013.01); *H04N 1/40068* (2013.01)

(56) References Cited

U.S. PATENT DOCUMENTS

| | | |
|---|---|---|
| 8,310,516 B2 | 11/2012 | Tanabe et al. |
| 8,687,036 B2 | 4/2014 | Ishida et al. |
| 9,035,988 B2 | 5/2015 | Nihei et al. |
| 2003/0025785 A1 | 2/2003 | Nihei et al. |
| 2003/0067533 A1 | 4/2003 | Omori et al. |
| 2003/0156184 A1 | 8/2003 | Suzuki et al. |
| 2004/0125199 A1 | 7/2004 | Omori et al. |
| 2005/0030435 A1 | 2/2005 | Uemura |
| 2005/0243163 A1 | 11/2005 | Ozasa et al. |
| 2006/0285186 A1 | 12/2006 | Ishida et al. |
| 2007/0030548 A1 | 2/2007 | Nihei et al. |
| 2007/0091163 A1 | 4/2007 | Omori et al. |
| 2007/0132828 A1 | 6/2007 | Ishida et al. |
| 2007/0242127 A1 | 10/2007 | Omori et al. |
| 2008/0088893 A1 | 4/2008 | Ishida et al. |
| 2008/0123160 A1 | 5/2008 | Omori et al. |
| 2008/0218813 A1 | 9/2008 | Tanabe et al. |
| 2008/0225106 A1 | 9/2008 | Omori et al. |
| 2008/0239336 A1 | 10/2008 | Tanabe et al. |
| 2008/0267663 A1 | 10/2008 | Ichii et al. |
| 2009/0167837 A1 | 7/2009 | Ishida et al. |
| 2009/0174915 A1 | 7/2009 | Nihei et al. |
| 2009/0195635 A1 | 8/2009 | Ishida et al. |
| 2009/0231656 A1 | 9/2009 | Suzuki et al. |
| 2009/0303451 A1 | 12/2009 | Miyake et al. |
| 2010/0119262 A1 | 5/2010 | Omori et al. |
| 2010/0214637 A1 | 8/2010 | Nihei et al. |
| 2011/0199657 A1 | 8/2011 | Ishida et al. |
| 2011/0228037 A1 | 9/2011 | Omori et al. |
| 2012/0099165 A1 | 4/2012 | Omori et al. |
| 2012/0189328 A1 | 7/2012 | Suzuki et al. |
| 2012/0293783 A1 | 11/2012 | Ishida et al. |
| 2013/0302052 A1 | 11/2013 | Iwata et al. |
| 2014/0139603 A1 | 5/2014 | Fujita et al. |
| 2014/0139605 A1 | 5/2014 | Fujita et al. |
| 2014/0176656 A1 | 6/2014 | Omori et al. |
| 2014/0268186 A1* | 9/2014 | Iwata ................ G06K 15/1873 358/1.2 |
| 2014/0327938 A1 | 11/2014 | Ishida et al. |
| 2014/0333940 A1 | 11/2014 | Iwata et al. |
| 2014/0333941 A1 | 11/2014 | Iwata et al. |
| 2015/0125171 A1 | 5/2015 | Iwata et al. |
| 2015/0156373 A1* | 6/2015 | Fujita ................ H04N 1/40056 358/475 |
| 2015/0177638 A1 | 6/2015 | Suhara |
| 2015/0180200 A1 | 6/2015 | Fujita et al. |
| 2015/0251442 A1 | 9/2015 | Ishida et al. |
| 2015/0324671 A1 | 11/2015 | Iwata et al. |
| 2015/0350491 A1 | 12/2015 | Iwata et al. |
| 2016/0012322 A1 | 1/2016 | Iwata et al. |

FOREIGN PATENT DOCUMENTS

| | | |
|---|---|---|
| JP | 2004-354986 | 12/2004 |
| JP | 4640257 | 12/2010 |
| JP | 4968902 | 4/2012 |
| JP | 2014177109 A * | 9/2014 |
| JP | 2015104918 A * | 6/2015 |
| JP | 2015-123611 | 7/2015 |

* cited by examiner

LIGHT SOURCE DRIVE CONTROL DEVICE, IMAGE FORMING APPARATUS, LIGHT SOURCE DRIVE CONTROL METHOD, AND COMPUTER PROGRAM PRODUCT

CROSS-REFERENCE TO RELATED APPLICATIONS

The present application claims priority to and incorporates by reference the entire contents of Japanese Patent Application No. 2015-023632 filed in Japan on Feb. 9, 2015.

BACKGROUND OF THE INVENTION

1. Field of the Invention

The present invention relates to a light source drive control device, an image forming apparatus, a light source drive control method, and a computer program product.

2. Description of the Related Art

In recent years, digital printing machines using electrophotographic process are increasingly used in a production printing field. Therefore, higher image quality and higher reliability are demanded of the digital printing machine using the electrophotographic process. Particularly, improvement of reproducibility of thin lines, improvement of character reproducibility (improvement of reproducibility of characters of small size corresponding to, for example, two to three points), and suppression of character thickening owing to the electrophotographic process are demanded of the digital printing machine using the electrophotographic process.

For the purpose of achieving high image quality, the digital printing machine using the electrophotographic process includes an image processing unit that corrects image data by image processing. The image processing unit performs image processing with multiple-bit data at a high resolution of, for example, 1200 dots per inch (dpi) or 2400 dpi.

Examples of the digital printing machine using the electrophotographic process include, but are not limited to, a photoconductor drum whose surface functions as a photoconductive layer surface to be scanned, a light source that emits a laser beam, a polygon mirror that deflects the laser beam emitted from the light source, and a scanning optical system that guides the laser beam deflected by the polygon mirror to the surface of the photoconductor drum (surface to be scanned). The digital printing machine using the electrophotographic process modulates a beam emitted from the light source based on image data, irradiates the surface to be scanned with the beam emitted from the light source, and scans the surface to be scanned with the beam, thus forming an electrostatic latent image according to the image data on the photoconductor drum.

The digital printing machine using the electrophotographic process configured in the above manner uses an element, as the light source, having a plurality of light emitting points such as a laser diode array (LDA) or a vertical-cavity surface-emitting laser (VCSEL). Thus, the digital printing machine using the electrophotographic process can form an electrostatic latent image of, for example, 2400 dpi or 4800 dpi, which is higher resolution than that of image data of 1200 dpi.

Japanese Patent No. 4968902 and Japanese Patent No. 4640257 disclose an image processing method, implemented through processing in an image processing unit, for preventing collapse of a reversed character and improving character reproducibility by detecting a white part in an image to enlarge a white line or to correct pixels around a white letter.

Japanese Laid-open Patent Publication No. 2004-354986 discloses an exposure control technique upon image formation by an exposure optical device that forms an image using a plurality of exposure optical systems. An image forming method described in Japanese Laid-open Patent Publication No. 2004-354986 allows the reproducibility of small dots and thin lines to be improved, thereby improving the image quality.

However, the image processing method disclosed in Japanese Patent Nos. 4968902 and 4640257 has a problem that thin lines and characters of small size cannot clearly be reproduced.

Moreover, the image forming method disclosed in Japanese Laid-open Patent Publication No. 2004-354986 has a problem that thin lines and characters of small size cannot clearly be reproduced because the thin line formed in image forming process becomes thicker than an assumed line width with a decrease in the line width of the thin line of the image data.

In general, there is also a problem that the reproducibility of a thin line is decreased by performing correction to make a line width narrower by image data such that the thin line formed in the image forming process is not made thicker than the assumed line width, which leads to occurrence of defects such as blurring of thin lines.

In view of the above, there is a need to provide a light source drive control device, an image forming apparatus, a light source drive control method, and a computer program product capable of clearly reproducing thin lines and characters of small size.

SUMMARY OF THE INVENTION

It is an object of the present invention to at least partially solve the problems in the conventional technology.

A light source drive control device includes: an image data generating part that generates line-thinned image data having been subjected to line thinning processing for thinning an edge pixel in image data by a first pixel width; a pixel width setting part that sets a second pixel width of an edge in the line-thinned image data such that a ratio between the first pixel width and the second pixel width is constant; an intensity information generating part that generates intensity information including a first intensity at which a pixel not included in the set second pixel width is exposed and a second intensity at which a pixel included in the second pixel width is exposed and which is higher than the first intensity; a strong exposure data generating part that generates a light source modulation signal for controlling light emission of a light source according to the line-thinned image data and a drive current switching signal based on the intensity information; a drive current setting part that switches drive current data for setting the first intensity or the second intensity and to be applied to a light source based on the drive current switching signal and outputs the drive current data; and a light source driving part that drives a light source based on the light source modulation signal and the drive current data.

A light source drive control method includes: generating line-thinned image data having been subjected to line thinning processing for thinning an edge pixel in image data by a first pixel width; setting a second pixel width of an edge in the line-thinned image data such that a ratio between the first pixel width and the second pixel width is constant;

generating intensity information including a first intensity at which a pixel not included in the set second pixel width is exposed and a second intensity at which a pixel included in the second pixel width is exposed and which is higher than the first intensity; generating strong exposure data for generating a light source modulation signal for controlling light emission of a light source according to the line-thinned image data and a drive current switching signal based on the intensity information; switching drive current data for setting the first intensity or the second intensity and to be applied to a light source based on the drive current switching signal and outputting the drive current data; and driving a light source based on the light source modulation signal and the drive current data.

A computer program product includes a non-transitory computer-readable medium containing an information processing program. The program causes a computer of a light source drive control device to perform: generating line-thinned image data having been subjected to line thinning processing for thinning an edge pixel in image data by a first pixel width; setting a second pixel width of an edge in the line-thinned image data such that a ratio between the first pixel width and the second pixel width is constant; generating intensity information including a first intensity at which a pixel not included in the set second pixel width is exposed and a second intensity at which a pixel included in the second pixel width is exposed and which is higher than the first intensity; generating strong exposure data for generating a light source modulation signal for controlling light emission of a light source according to the line-thinned image data and a drive current switching signal based on the intensity information; switching drive current data for setting the first intensity or the second intensity and to be applied to a light source based on the drive current switching signal and outputting the drive current data; and driving a light source based on the light source modulation signal and the drive current data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a light source drive control device, an image forming apparatus, a light source drive control method, and a computer program product will be explained in detail below with reference to the accompanying drawings. It should be noted that the present invention is not limited by the embodiments. In addition, the embodiments can be appropriately combined with each other in a range in which contents are not contradicted.

An example of implementing the light source drive control device according to the present embodiment as a device being part of the image forming apparatus will be explained below. An image forming apparatus to which the light source drive control device according to the present embodiment can be applied is not limited to the image forming apparatus. A case in which the light source drive control device according to the present invention is applied to the image forming apparatus such as a color printer will be explained below as an example; however, the embodiments are not limited thereto.

Figure 1:
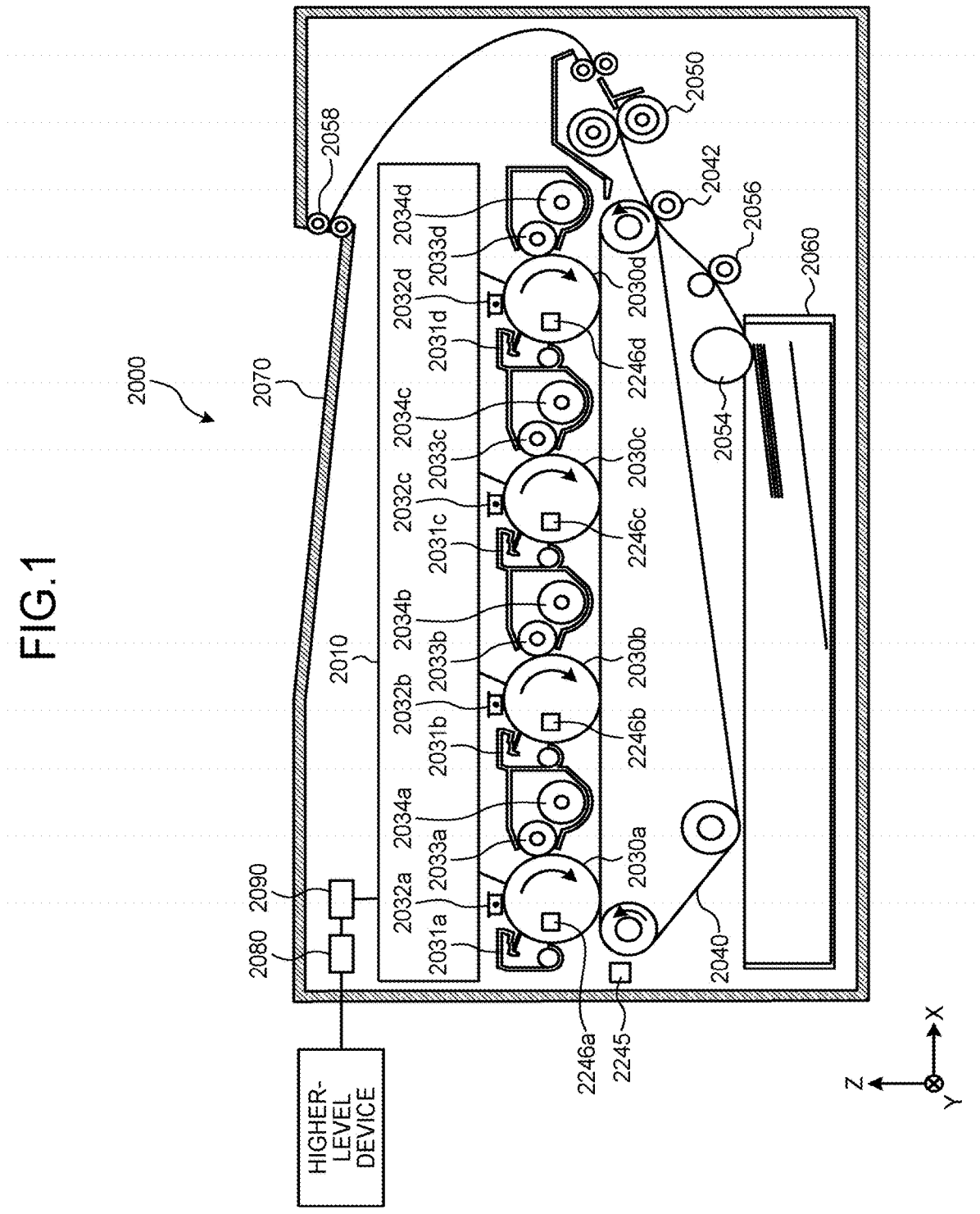
FIG. 1 is a diagram of a schematic configuration of a color printer according to a present embodiment.

First of all, a color printer 2000 will be explained below as an example of the image forming apparatus according to the present embodiment with reference to FIG. 1. FIG. 1 is a diagram of a schematic configuration of the color printer according to the present embodiment.

As illustrated in FIG. 1, the color printer 2000 produces a printed material by transferring toner to a recording sheet (object). The color printer 2000 is a multi-color printer employing a tandem system that forms a full-color image by superimposing four colors (black, cyan, magenta, and yellow).

The color printer 2000 includes an optical scanning device 2010, four photoconductor drums 2030a, 2030b, 2030c, and 2030d (the four photoconductor drums may be collectively called "photoconductor drum(s) 2030"), four cleaning units 2031a, 2031b, 2031c, and 2031d (the four units may be collectively called "cleaning unit(s) 2031"), and four charging devices 2032a, 2032b, 2032c, and 2032d (the four charging devices may be collectively called "charging device(s) 2032"). The color printer 2000 further includes four developing rollers 2033a, 2033b, 2033c, and 2033d (the four developing rollers may be collectively called "developing roller(s) 2033"), and four toner cartridges 2034a, 2034b, 2034c, and 2034d (the four toner cartridges may be collectively called "toner cartridge(s) 2034"). Moreover, the color printer 2000 includes a transfer belt 2040, a transfer roller 2042, a fixing roller 2050, a paper feeding roller 2054, a registration roller pair 2056, a paper ejection roller 2058, a paper feeding tray 2060, a paper ejection tray 2070, a communication control device 2080, a density detector 2245, four home position sensors 2246a, 2246b, 2246c, and 2246d (the four home position sensors may be collectively called "home position sensor(s) 2246"), and a printer control device 2090.

The communication control device 2080 controls bidirectional communication with a higher-level device (e.g., computer) through a network, or the like.

The printer control device 2090 integrally controls the respective units included in the color printer 2000. The printer control device 2090 includes a central processing unit (CPU), a read-only memory (ROM) that stores programs described in codes to be executed by the CPU and various types of data used for executing the programs, a random access memory (RAM) being a working memory, and an analog-to-digital (AD) conversion circuit that converts analog data to digital data, and the like. The printer control device 2090 controls each of the units according to a request from the higher-level device and transmits image data received from the higher-level device to the optical scanning device 2010.

The photoconductor drum 2030a, the charging device 2032a, the developing roller 2033a, the toner cartridge 2034a, and the cleaning unit 2031a are used as a set. These components constitute an image forming station (which may be called "K station") for forming an image in Black.

The photoconductor drum 2030b, the charging device 2032b, the developing roller 2033b, the toner cartridge 2034b, and the cleaning unit 2031b are used as a set. These components constitute an image forming station (which may be called "C station") for forming an image in Cyan.

The photoconductor drum 2030c, the charging device 2032c, the developing roller 2033c, the toner cartridge 2034c, and the cleaning unit 2031c are used as a set. These components constitute an image forming station (which may be called "M station") for forming an image in Magenta.

The photoconductor drum 2030d, the charging device 2032d, the developing roller 2033d, the toner cartridge 2034d, and the cleaning unit 2031d are used as a set. These components constitute an image forming station (which may be called "Y station") for forming an image in Yellow.

Each of the photoconductor drums 2030 is an example of a latent image bearer, and a photoconductive layer is formed on a surface of each of the photoconductor drums 2030. In other words, the surface of each of the photoconductor drums 2030 is a surface to be scanned. The photoconductor drums 2030a, 2030b, 2030c, and 2030d are configured so that their rotating shafts are arranged side by side in parallel and, for example, all of them is rotated in the same direction (e.g., in an arrow direction in the plane of FIG. 1).

Herein, an XYZ three-dimensional coordinate system is described based on the direction parallel to the central axis of each of the photoconductor drums 2030 as an Y-axis direction and based on the direction along the arrangement direction of the photoconductor drums 2030 as an X-axis direction.

Each of the charging devices 2032 uniformly charges the surface of a corresponding photoconductor drum 2030. The optical scanning device 2010 irradiates the surface of the corresponding charged photoconductor drum 2030 with a beam modulated in each color based on image data (black image data, cyan image data, magenta image data, and yellow image data). With this irradiation, a charge only on the portion of the surface of each of the photoconductor drums 2030 irradiated with the light is lost, and a latent image corresponding to the image data is formed on the surface of each of the photoconductor drums 2030. The latent image formed herein is moved in the direction of a corresponding developing roller 2033 in association with the rotation of the photoconductor drum 2030. The configuration of the optical scanning device 2010 will be explained in detail later.

Incidentally, in each of the photoconductor drums 2030, an area to which image data is written is called "effective scanning area", "image forming area", "effective image area", or the like.

Black toner is stored in the toner cartridge 2034a. The black toner is supplied to the developing roller 2033a. Cyan toner is stored in the toner cartridge 2034b. The cyan toner is supplied to the developing roller 2033b. Magenta toner is stored in the toner cartridge 2034c. The magenta toner is supplied to the developing roller 2033c. Yellow toner is stored in the toner cartridge 2034d. The yellow toner is supplied to the developing roller 2033d.

The toner supplied from a corresponding toner cartridge 2034 is thinly and uniformly applied to the surface of the developing roller 2033 in association with the rotation thereof. When coming in contact with the surface of the corresponding photoconductor drum 2030, the toner on the surface of each of the developing rollers 2033 is transferred to only a portion on the surface irradiated with the light and adheres thereto. In other words, each of the developing rollers 2033 causes the toner to adhere to the latent image formed on the surface of a corresponding photoconductor drum 2030, thus visualizing the latent image.

The transfer belt 2040 is wound around a belt rotating mechanism to unidirectionally rotate. The outer surface of the transfer belt 2040 comes in contact with the surfaces of the photoconductor drums 2030a, 2030b, 2030c, and 2030d at respective positions on the opposite side to the optical scanning device 2010. The outer surface of the transfer belt 2040 also comes in contact with the transfer roller 2042.

Then, an image (toner image) to which the toner adheres on the surface of each of the photoconductor drums 2030 moves in the direction of the transfer belt 2040 in association with the rotation of each of the photoconductor drums 2030. The toner images in yellow, magenta, cyan, and black are sequentially transferred to the transfer belt 2040 at each predetermined timing to be superimposed on one another, thus forming a color image. The color image formed on the transfer belt 2040 is moved to the direction of the transfer roller 2042 in association with the movement of the transfer belt 2040.

The paper feeding tray 2060 contains sheets of recording medium. The paper feeding roller 2054 is disposed near the paper feeding tray 2060. The paper feeding roller 2054 takes the sheets from the paper feeding tray 2060 one by one and conveys the sheet to the registration roller pair 2056.

The registration roller pair 2056 feeds the sheet toward a space between the transfer belt 2040 and the transfer roller 2042 at a predetermined timing. Thus, the color image on the transfer belt 2040 is transferred to the sheet. The sheet to which the color image is transferred is fed to the fixing roller 2050.

The fixing roller 2050 applies heat and pressure to the sheet. Thereby the fixing roller 2050 can fix the toner on the sheet. The sheet on which the toner is fixed is conveyed to the paper ejection tray 2070 through the paper ejection roller 2058, and is sequentially stacked on the paper ejection tray 2070.

Each of the cleaning units 2031 removes toner (residual toner) remaining on the surface of a corresponding photoconductor drum 2030. The surface of the photoconductor drum 2030 from which the residual toner is removed is again returned to the position facing a corresponding charging device 2032.

The density detector 2245 is disposed on a −X side of the transfer belt 2040 (which is a position on an upstream side of the fixing roller 2050 in the direction of movement of the transfer belt 2040 and on a downstream side of the four photoconductor drums 2030). The density detector 2245 has three optical sensors 2245a, 2245b, and 2245c (not illustrated) as one example.

The optical sensor 2245a is disposed at a position facing near the end on a −Y side within an effective image area in the transfer belt 2040 (one end side in the width direction of the transfer belt 2040). The optical sensor 2245c is disposed at a position facing near the end on a +Y side within the effective image area in the transfer belt 2040 (the other end side in the width direction of the transfer belt 2040). The optical sensor 2245b is disposed at a substantially center position between the optical sensor 2245a and the optical sensor 2245c in the main scanning direction (the center position in the width direction of the transfer belt 2040). For the main scanning direction (Y-axis direction), it is assumed that the center position of the optical sensor 2245a is set to Y1, the center position of the optical sensor 2245b is set to Y2, and the center position of the optical sensor 2245c is set to Y3.

Each of the optical sensors 2245a, 2245b, and 2245c includes, as one example, a light-emitting diode (LED) (not illustrated) that emits light (hereinafter, also called "detection light") to the transfer belt 2040, a specular reflection light receiving element (not illustrated) that receives a specular reflection light from the transfer belt 2040 or from a toner pad on the transfer belt 2040, and a diffuse reflection light receiving element (not illustrated) that receives a diffuse reflection light from the transfer belt 2040 or from a toner pad on the transfer belt 2040. Each of the light receiving elements outputs a signal (photoelectric conversion signal) according to an intensity of received light.

The home position sensor 2246a detects a home position of the rotation in the photoconductor drum 2030a. The home position sensor 2246b detects a home position of the rotation in the photoconductor drum 2030b. The home position sensor 2246c detects a home position of the rotation in the photoconductor drum 2030c. The home position sensor 2246d detects a home position of the rotation in the photoconductor drum 2030d.

Figure 2:
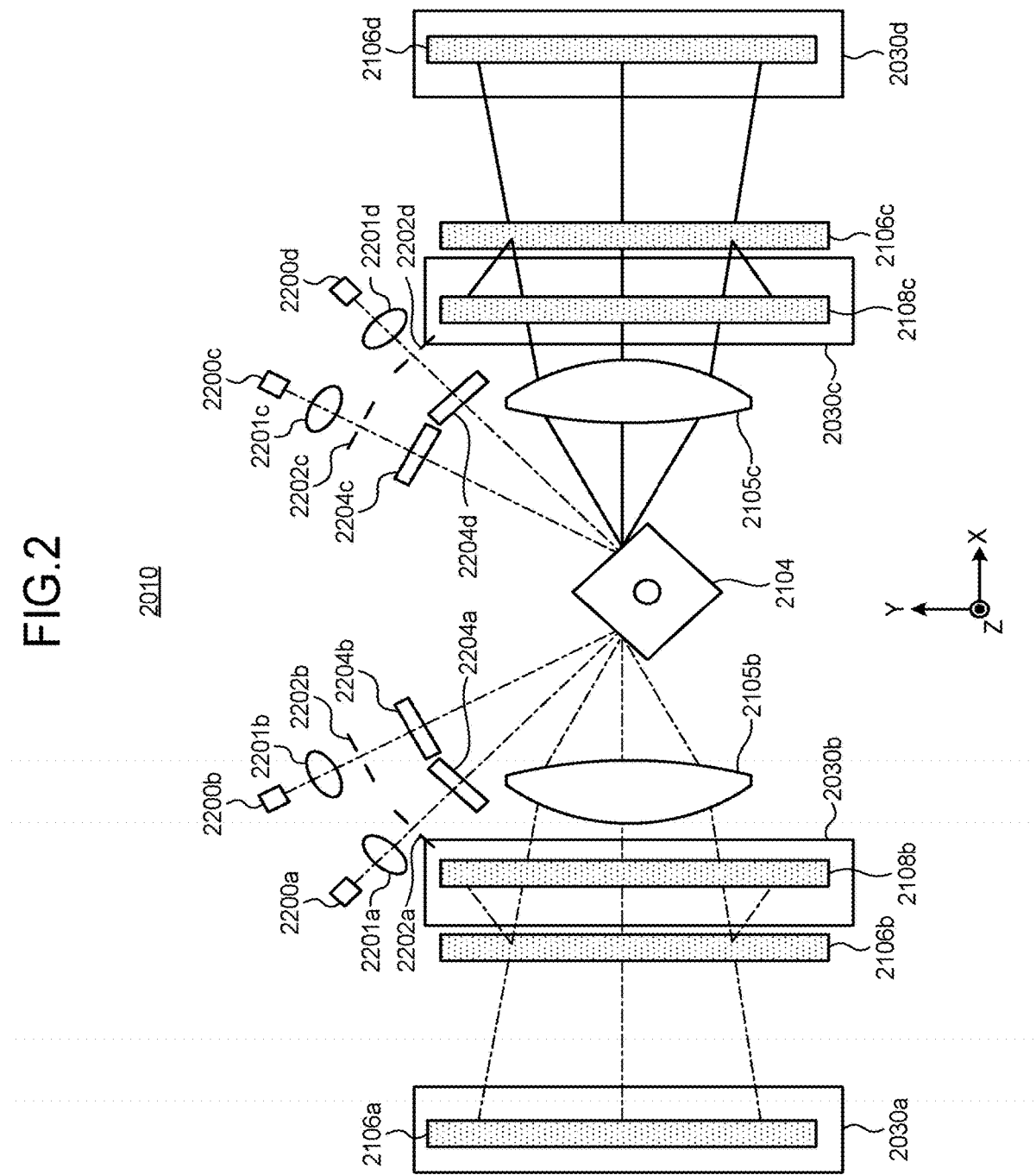
FIG. 2 is a diagram of a configuration example of an optical system of an optical scanning device.
Figure 3:
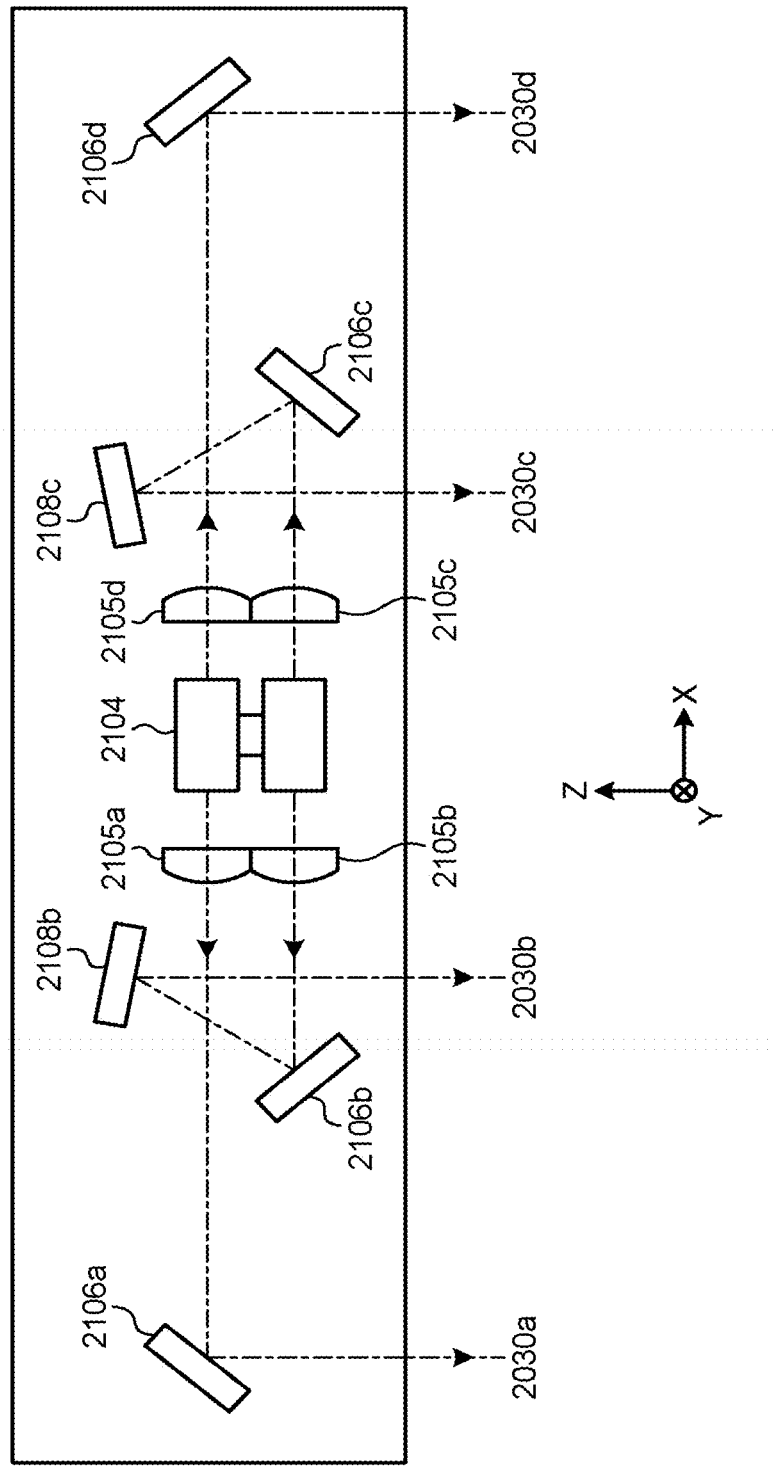
FIG. 3 is a diagram of an example of an optical path from a polygon mirror to each of photoconductor drums.

FIG. 2 is a diagram of a configuration example of an optical system of the optical scanning device. FIG. 3 is a diagram of an example of an optical path from a polygon mirror to each of the photoconductor drums.

The configuration of the optical system of the optical scanning device 2010 will be explained next. As illustrated in FIG. 2 and FIG. 3, the optical scanning device 2010 includes, as the optical system, four light sources 2200a, 2200b, 2200c, and 2200d (the four light sources may be collectively called "light source(s) 2200"), four coupling lenses 2201a, 2201b, 2201c, and 2201d (the four coupling lenses may be collectively called "coupling lens(es) 2201"), four aperture plates 2202a, 2202b, 2202c, and 2202d (the four aperture plates may be collectively called "aperture plate(s) 2202"), and four cylindrical lenses 2204a, 2204b, 2204c, and 2204d (the four cylindrical lenses may be collectively called "cylindrical lens(es) 2204"). Furthermore, the optical scanning device 2010 includes, as the optical system, a polygon mirror 2104, four scanning lenses 2105a, 2105b, 2105c, and 2105d (the four scanning lenses may be collectively called "scanning lens(es) 2105"), and six reflecting mirrors 2106a, 2106b, 2106c, 2106d, 2108b, and 2108c. These are assembled at predetermined positions of an optical housing.

Although the optical scanning device 2010 also includes electrical circuits, the electrical circuits will be explained with reference to FIG. 4 and subsequent figures.

Each of the light sources 2200a, 2200b, 2200c, and 2200d includes a surface emitting laser array in which a plurality of light emitting portions are two-dimensionally arranged. The light emitting portions of the surface emitting laser array are arranged so that intervals between light emitting portions are uniform when all the light emitting portions are orthogonally projected to a virtual line extending in a direction corresponding to the sub-scanning direction. In the present embodiment, each of the light sources 2200a, 2200b, 2200c, and 2200d is, as one example, a vertical-cavity surface-emitting laser (VCSEL).

The coupling lens 2201a is disposed on an optical path of the beam emitted from the light source 2200a and converts the beam passing therethrough into an approximately parallel beam. The coupling lens 2201b is disposed on an optical path of the beam emitted from the light source 2200b and converts the beam passing therethrough into an approximately parallel beam. The coupling lens 2201c is disposed on an optical path of the beam emitted from the light source 2200c and converts the beam passing therethrough into an approximately parallel beam. The coupling lens 2201d is disposed on an optical path of the beam emitted from the light source 2200d and converts the beam passing therethrough into an approximately parallel beam.

The aperture plate 2202a has an opening and shapes the beam that has passed through the coupling lens 2201a. The aperture plate 2202b has an opening and shapes the beam that has passed through the coupling lens 2201a. The aperture plate 2202c has an opening and shapes the beam that has passed through the coupling lens 2201c. The aperture plate 2202d has an opening and shapes the beam that has passed through the coupling lens 2201d.

The cylindrical lens 2204a focuses the beam having passed through the opening of the aperture plate 2202a on a position near a deflective-reflective surface of the polygon mirror 2104 in a Z-axis direction. The cylindrical lens 2204b focuses the beam having passed through the opening of the aperture plate 2202b on a position near a deflective-reflective surface of the polygon mirror 2104 in the Z-axis direction. The cylindrical lens 2204c focuses the beam having passed through the opening of the aperture plate 2202c on a position near a deflective-reflective surface of the polygon mirror 2104 in the Z-axis direction. The cylindrical lens 2204d focuses the beam having passed through the opening of the aperture plate 2202d on a position near a deflective-reflective surface of the polygon mirror 2104 in the Z-axis direction.

The optical system composed of the coupling lens 2201a, the aperture plate 2202a, and the cylindrical lens 2204a is a pre-deflector optical system of the K station. The optical system composed of the coupling lens 2201b, the aperture plate 2202b, and the cylindrical lens 2204b is a pre-deflector optical system of the C station. The optical system composed of the coupling lens 2201c, the aperture plate 2202c, and the cylindrical lens 2204c is a pre-deflector optical system of the M station. The optical system composed of the coupling lens 2201d, the aperture plate 2202d, and the cylindrical lens 2204d is a pre-deflector optical system of the Y station.

The polygon mirror 2104 has a four-surface mirror having a two-stage structure that rotates around an axis parallel to the Z-axis and each surface of the mirror functions as a deflective-reflective surface. It is arranged such that the beam from the cylindrical lens 2204b and the beam from the cylindrical lens 2204c are respectively deflected by the four-surface mirror at a first stage (lower stage), and such that the beam from the cylindrical lens 2204a and the beam from the cylindrical lens 2204d are respectively deflected by the four-surface mirror at a second stage (upper stage).

Moreover, each of the beams from the cylindrical lens 2204a and the cylindrical lens 2204b is deflected to the −X side of the polygon mirror 2104, and each of the beams from the cylindrical lens 2204c and the cylindrical lens 2204d is deflected to the +X side of the polygon mirror 2104.

Each of the scanning lenses 2105a, 2105b, 2105c, and 2105d has an optical power to focus the beam on a position near a corresponding photoconductor drum 2030 and has an optical power that causes a light spot to move in the main scanning direction on the surface of the corresponding photoconductor drum 2030 at a constant speed in association with the rotation of the polygon mirror 2104.

The scanning lens 2105a and the scanning lens 2105b are arranged on the −X side of the polygon mirror 2104. The scanning lens 2105c and the scanning lens 2105d are arranged on the +X side of the polygon mirror 2104.

The scanning lens 2105a and the scanning lens 2105b are layered in the Z-axis direction. The scanning lens 2105b is opposed to the four-surface mirror at the first stage. The scanning lens 2105a is opposed to the four-surface mirror at the second stage.

The scanning lens 2105c and the scanning lens 2105d are layered in the Z-axis direction. The scanning lens 2105c is opposed to the four-surface mirror at the first stage. The scanning lens 2105d is opposed to the four-surface mirror at the second stage.

The beam, from the cylindrical lens 2204a, deflected by the polygon mirror 2104 is irradiated to the photoconductor drum 2030a through the scanning lens 2105a and the reflecting mirror 2106a to form a light spot. The light spot moves in the longitudinal direction of the photoconductor drum 2030a with rotation of the polygon mirror 2104. That is, the light spot scans on the photoconductor drum 2030a. The direction of movement of the light spot at this time is "main scanning direction" on the photoconductor drum 2030a, and the direction of rotation of the photoconductor drum 2030a is "sub-scanning direction" on the photoconductor drum 2030a.

The beam, from the cylindrical lens 2204b, deflected by the polygon mirror 2104 is irradiated to the photoconductor drum 2030b through the scanning lens 2105b, the reflecting mirror 2106b, and the reflecting mirror 2108b to form a light spot. The light spot moves in the longitudinal direction of the photoconductor drum 2030b with rotation of the polygon mirror 2104. That is, the light spot scans on the photoconductor drum 2030b. The direction of movement of the light spot at this time is "main scanning direction" on the photoconductor drum 2030b, and the direction of rotation of the photoconductor drum 2030b is "sub-scanning direction" on the photoconductor drum 2030b.

The beam, from the cylindrical lens 2204c, deflected by the polygon mirror 2104 is irradiated to the photoconductor drum 2030c through the scanning lens 2105c, the reflecting mirror 2106c, and the reflecting mirror 2108c to form a light spot. The light spot moves in the longitudinal direction of the photoconductor drum 2030c with rotation of the polygon mirror 2104. That is, the light spot scans on the photoconductor drum 2030c. The direction of movement of the light spot at this time is "main scanning direction" on the photoconductor drum 2030c, and the direction of rotation of the photoconductor drum 2030c is "sub-scanning direction" on the photoconductor drum 2030c.

The beam, from the cylindrical lens 2204d, deflected by the polygon mirror 2104 is irradiated to the photoconductor drum 2030d through the scanning lens 2105d and the reflecting mirror 2106d to form a light spot. The light spot moves in the longitudinal direction of the photoconductor drum 2030d with rotation of the polygon mirror 2104. That is, the light spot scans on the photoconductor drum 2030d. The direction of movement of the light spot at this time is "main scanning direction" on the photoconductor drum 2030d, and the direction of rotation of the photoconductor drum 2030d is "sub-scanning direction" on the photoconductor drum 2030d.

The respective reflecting mirrors 2106a, 2106b, 2106c, 2106d, 2108b, and 2108c are arranged such that optical path lengths from the polygon mirror 2104 to respectively corresponding photoconductor drums 2030 coincide with each other, and such that incidence positions and incidence angles of beams on respectively corresponding photoconductor drums 2030 are equal to each other.

The optical system disposed on the optical path between the polygon mirror 2104 and each of the photoconductor drums 2030 is also called "scanning optical system". Herein, the scanning optical system of the K station is configured with the scanning lens 2105a and the reflecting mirror 2106a. The scanning optical system of the C station is configured with the scanning lens 2105b and the two reflecting mirrors 2106b and 2108b. The scanning optical system of the M station is configured with the scanning lens 2105c and the two reflecting mirrors 2106c and 2108c. Furthermore, the scanning optical system of the Y station is configured with the scanning lens 2105d and the reflecting mirror 2106d. In each of the scanning optical systems, the scanning lens 2105 may be configured with a plurality of lenses.

Figure 4:
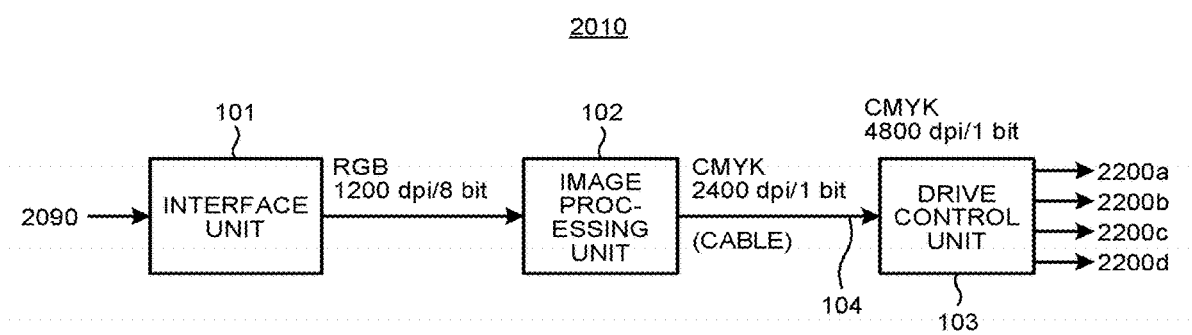
FIG. 4 is a diagram of a configuration example of an electrical system of the optical scanning device.

FIG. 4 is a diagram of a configuration example of an electrical system of the optical scanning device. The optical scanning device 2010 includes an interface unit 101, an image processing unit 102, and a drive control unit 103 as components of the electrical system. In the present embodiment, the drive control unit 103 corresponds to the light source drive control device. A light source driving unit corresponds to "light source drive control device" according to the appended claims.

The interface unit 101 acquires image data transferred from a higher-level device (e.g., computer) from the printer control device 2090. The interface unit 101 then transfers the acquired image data to the image processing unit 102 in the subsequent stage.

In the present example, the interface unit 101 acquires image data in which the format is a RGB format, the resolution is 1200 dpi, and the number of bits is 8 bits, and transfers the acquired image data to the image processing unit 102.

The image processing unit 102 functions as an image processing part. The image processing unit 102 acquires the image data from the interface unit 101 and converts the image data into color image data corresponding to a printing system. As one example, the image processing unit 102 converts image data in the RGB format into image data of the tandem system (in a CMYK format). The image processing unit 102 performs various types of image processing in addition to data format conversion.

In the present example, the image processing unit 102 outputs the image data in the CMYK format in which the resolution is 2400 dpi and the number of bit is 1 bit. However, the resolution of the image data to be output from the image processing unit 102 is not limited to 2400 dpi. In addition, the resolution of the image data to be output from the image processing unit 102 is called first resolution.

Moreover, the image processing unit 102 generates tag information indicating whether each of pixels in the image data at the first resolution (2400 dpi) is a pixel forming a character or a line. The image processing unit 102 transfers the generated image data at the first resolution and tag information to the drive control unit 103.

The drive control unit 103 functions as the light source drive control device. The drive control unit 103 acquires image data at the first resolution and the tag information from the image processing unit 102, and converts the acquired image data into color image data at a second resolution corresponding to driving of the light source. The second resolution is higher than the first resolution. In the present embodiment, the drive control unit 103 converts the acquired image data into image data in the CMYK format in which the resolution is 4800 dpi and the number of bits is 1 bit.

The drive control unit 103 modulates the image data at the second resolution into a clock signal indicating light emitting timing of a pixel, to generate a modulation signal independent in each color. The drive control unit 103 drives the light sources 2200a, 2200b, 2200c, and 2200d to emit light according to a modulation signal corresponding to each of the colors. The drive control unit 103 may integrally perform the resolution conversion processing and the modulation processing.

The drive control unit 103 is a single integrated device configured as one chip provided, for example, near the light sources 2200a, 2200b, 2200c, and 2200d. The image processing unit 102 and the interface unit 101 are provided farther from the light sources 2200a, 2200b, 2200c, and 2200d as compared with the drive control unit 103. The image processing unit 102 and the drive control unit 103 are connected to each other with a cable 104.

The optical scanning device 2010 configured in the above manner can form a latent image by emitting the light according to the image data from the light sources 2200a, 2200b, 2200c, and 2200d.

Figure 5:
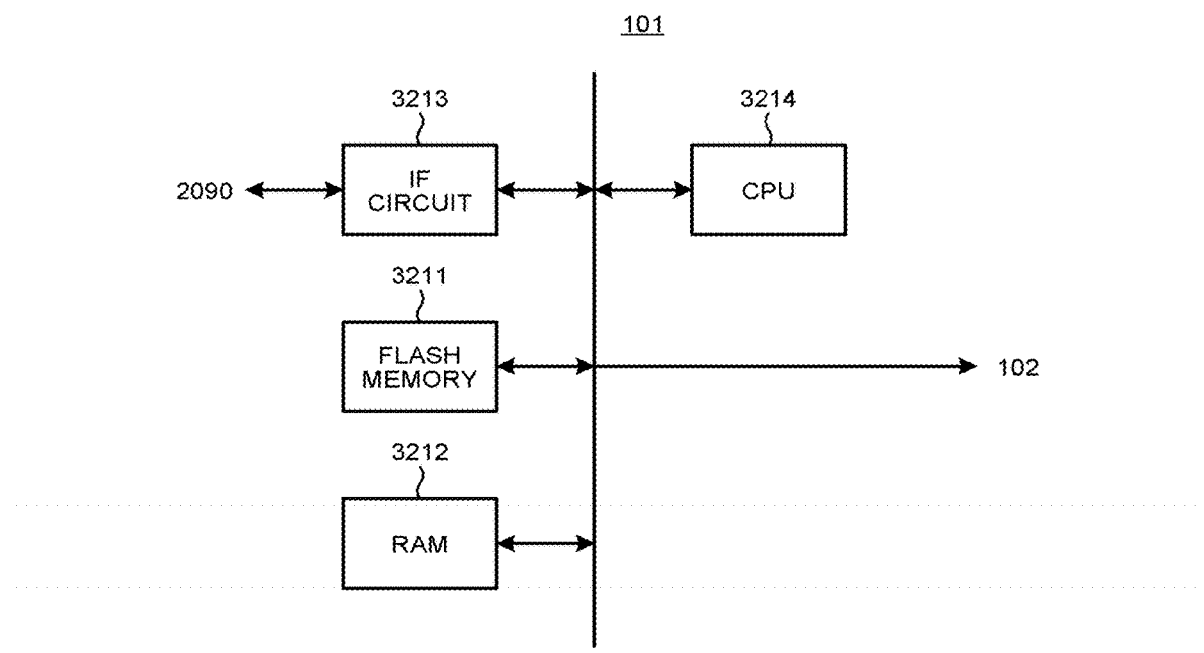
FIG. 5 is a diagram of a configuration example of an interface unit.

FIG. 5 is a diagram of a configuration example of the interface unit. The interface unit 101 includes, as one example, a flash memory 3211, a RAM 3212, an IF circuit 3213, and a CPU 3214. The flash memory 3211, the RAM 3212, the IF circuit 3213, and the CPU 3214 are connected to each other with a bus. The arrows illustrated in FIG. 4 indicate representative flow of signals and information, and do not represent all connection relationships between the respective units.

The flash memory 3211 stores programs executed by the CPU 3214 and various types of data required for execution of the programs by the CPU 3214. The RAM 3212 is a storage area for work when the CPU 3214 executes a program. The IF circuit 3213 is an interface that controls bidirectional communication with the printer control device 2090. The image data input from the printer control device 2090 is received through the IF circuit 3213.

The CPU 3214 operates according to the program stored in the flash memory 3211, and controls the entire optical scanning device 2010. The interface unit 101 configured in the above manner transfers the input image data (RGB format, 1200 dpi, and 8 bits) transmitted from the printer control device 2090 to the image processing unit 102.

Figure 6:
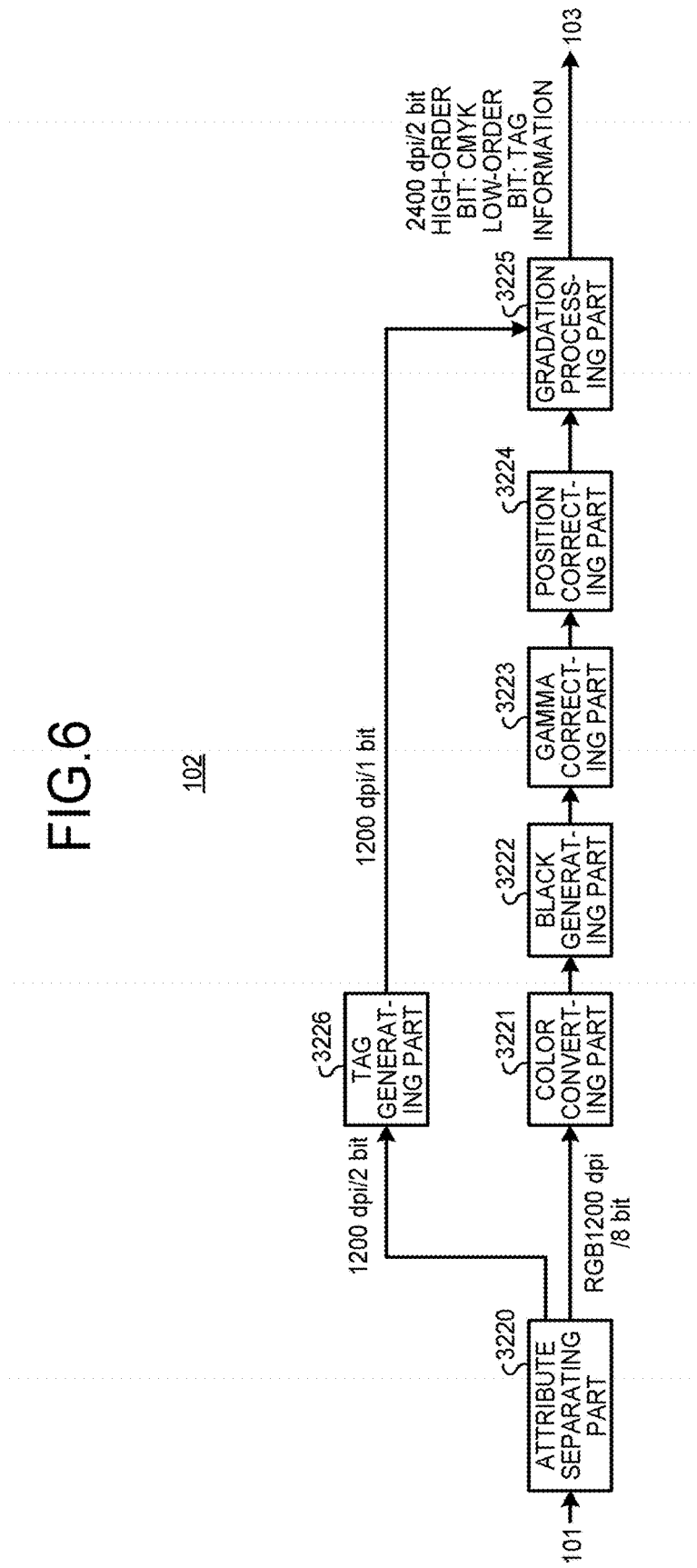
FIG. 6 is a diagram of a configuration example of an image processing unit.

FIG. 6 is a diagram of a configuration example of the image processing unit. The image processing unit 102 includes an attribute separating part 3220, a color converting part 3221, a black generating part 3222, a gamma correcting part 3223, a position correcting part 3224, a gradation processing part 3225, and a tag generating part 3226.

The attribute separating part 3220 receives input image data (RGB format, 1200 dpi, 8 bits) from the interface unit 101. Attribute information is added to each of pixels in the input image data. The attribute information indicates a type of an object as a source of its area (pixel). For example, if the pixel is a part of a character, an attribute indicating "character" is represented in the attribute information. For example, if the pixel is a part of a line, an attribute indicating "line" is represented in the attribute information. If the pixel is a part of a graphic, an attribute indicating "graphic" is represented in the attribute information. If the pixel is a part of a photo, an attribute indicating "photo" is represented in the attribute information.

The attribute separating part 3220 separates the attribute information and the image data from the input image data. Specifically, the attribute separating part 3220 separates the image data for each attribute so as to enable appropriate processing set for each attribute such as "text" as a pixel forming a character, "line" as a pixel forming a line drawing, and "image" as bitmap data. The attribute separating part 3220 transfers the separated attribute information and image data to the tag generating part 3226. The attribute separating part 3220 also transfers the image data to the color converting part 3221. The image data output from the attribute separating part 3220 is, as one example, RGB and 1200 dpi/8 bits. The attribute information (attribute data) output from the attribute separating part 3220 is, as one example, data whose resolution (1200 dpi) is the same as that of the image data and whose number of bits is 2 bits.

The color converting part 3221 converts 8-bit image data in the RGB format into 8-bit image data in a CMY format. The black generating part 3222 generates a black component from the image data in the CMY format generated by the color converting part 3221 to generate image data in the CMYK format. The gamma correcting part 3223 linearly converts the level of each color of the image data in the CMYK format generated by the black generating part 3222 using a table or the like. Specifically, the gamma correcting part 3223 performs, for example, gradation correction according to output characteristics of the printer on each of CMYK.

The position correcting part 3224 receives the image data from the gamma correcting part 3223, and removes noise or distortion. Moreover, the position correcting part 3224 performs position correction of the image by zooming or shifting. In this case, the position correcting part 3224 converts the resolution from 1200 dpi to 2400 dpi. The position correcting part 3224 outputs image data in the CMYK format at the resolution of 2400 dpi (the first resolution) in which one pixel is expressed by a plurality of bits (8 bits in the present embodiment).

The gradation processing part 3225 receives the 8-bit image data in the CMYK format at the resolution of 2400 dpi from the position correcting part 3224. The gradation processing part 3225 performs pseudo-halftone processing by, for example, dithering or error diffusion processing, to generate 1-bit area gradation data from the 8-bit image data. Specifically, the gradation processing part 3225 performs processing for changing the number of pixels and value in a certain area so as to become continuous gradation of a dot or line structure using, for example, binary or multivalued dither matrix for each CMYK.

The tag generating part 3226 generates tag information indicating whether each of pixels in the image data of 1200 dpi is a pixel forming a character or a line. The tag generating part 3226 generates tag information based on, as one example, the attribute information. Specifically, the tag generating part 3226 sets an area where a light source modulation data generating part 3233, explained later, performs processing using, for example, image data and the attribute information (text, image, line, or so) of the image data, and adds the tag information to a pixel in a target area.

In the present embodiment, the tag generating part 3226 allocates tag information indicating a character or a line to a black pixel to which the attribute information indicating a character or a line is added. The black pixel is a pixel in which a pixel value is 1 when the number of gradations is reduced to 1 bit and in which light is emitted from a light source 2200 to a photoconductor drum 2030. In addition, a white pixel is a pixel in which a pixel value becomes 0 when the number of gradations is reduced to 1 bit and in which light is not emitted from a light source 2200 to a photoconductor drum 2030.

The tag information generated by the tag generating part 3226 is transferred to the drive control unit 103 via the position correcting part 3224 and the gradation processing part 3225. The position correcting part 3224 subjects the processing for increasing the resolution of image data from 1200 dpi to 2400 dpi and the same processing as the processing for performing position correction on the image data, to the tag information. Thereby the position correcting part 3224 also increases the resolution of the tag information from 1200 dpi to 2400 dpi, and can allocate the tag information to each pixel after the resolution is increased. Although FIG. 6 represents the tag information so as to be input to the gradation processing part 3225, the embodiment is not limited thereto, and the tag information may be input to the position correcting part 3224.

The gradation processing part 3225 transmits the image data of one bit at the first resolution (2400 dpi) and the tag information of one bit at the first resolution (2400 dpi) to the drive control unit 103. In the present embodiment, the gradation processing part 3225 transmits the image data and the tag information in one pass. More specifically, the gradation processing part 3225 transmits 2-bit data at the first resolution (2400 dpi), which represents that a high-order bit indicates the image data (CMYK) and a low-order bit indicates the tag information, to the drive control unit 103.

In this way, the image processing unit 102 generates tag information associated with each pixel in the image data at the first resolution (2400 dpi) and can transmit the generated tag information to the drive control unit 103. The image processing unit 102 may be partially or entirely implemented by hardware or may be implemented by the CPU executing a software program.

Figure 7:
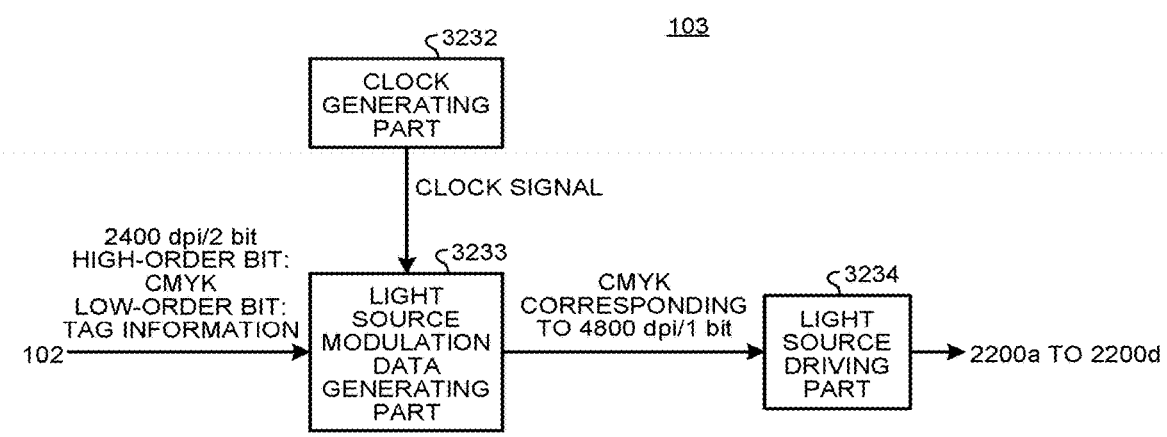
FIG. 7 is a diagram of a configuration example of a drive control unit.
Figure 8:
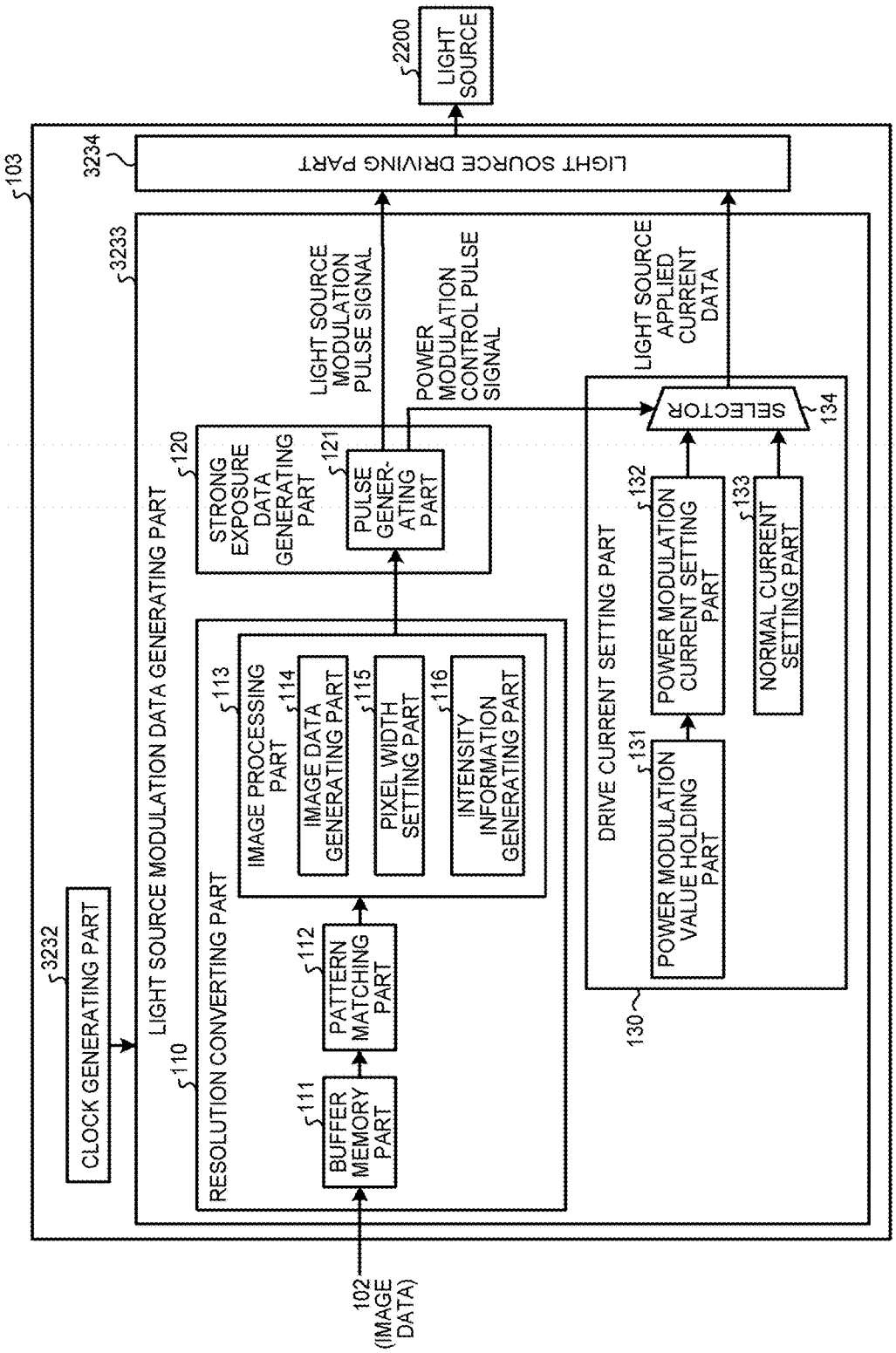
FIG. 8 is a block diagram of an example of a functional configuration of a light source modulation data generating part.
Figure 9:
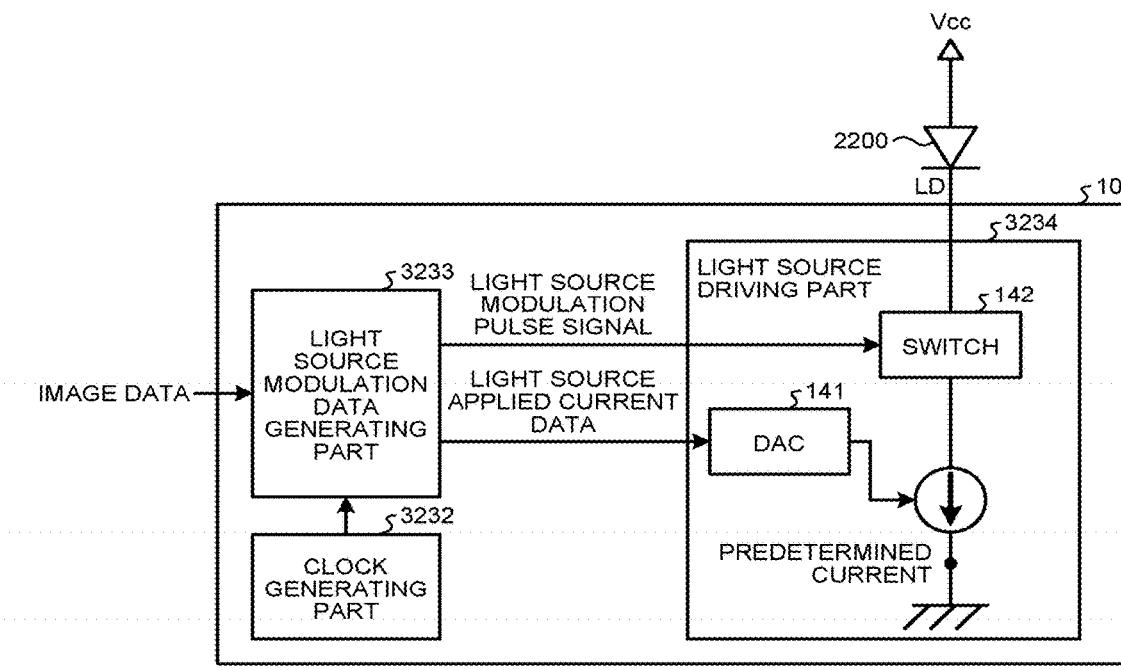
FIG. 9 is a block diagram of an example of a functional configuration of a light source driving part.

The configuration of the drive control unit 103 will be explained next with reference to FIG. 7 to FIG. 9. FIG. 7 is a diagram of an example of schematic configuration of the drive control unit. FIG. 8 is a block diagram of an example of a functional configuration of the light source modulation data generating part. FIG. 9 is a block diagram of an example of a functional configuration of the light source driving unit. Hereinafter, the drive control unit may also be written as "light source drive control device".

As illustrated in FIG. 7 to FIG. 9, the drive control unit (light source drive control device) 103 includes a clock generating part (pixel clock generating part) 3232, the light source modulation data generating part 3233, and a light source driving part 3234.

The clock generating part 3232 generates a clock signal indicating light emitting timing of a pixel. That is, the clock generating part 3232 generates a pixel clock signal. The clock signal is a signal in which image data can be modulated by the resolution corresponding to 4800 dpi.

The light source modulation data generating part 3233 acquires image data at the first resolution from the image processing unit 102. The light source modulation data generating part 3233 generates image data at the second resolution higher than the first resolution based on the image data at the first resolution and the tag information. In the present embodiment, the light source modulation data generating part 3233 generates image data corresponding to the CMYK format, 4800 dpi, and 1 bit based on the 1-bit image data in the CMYK format at 2400 dpi and the tag information. The light source modulation data generating part 3233 modulates the image data at the second resolution to a clock signal and generates a modulation signal for forming an image of 4800 dpi.

Specifically, the light source modulation data generating part 3233 divides the input image data at the first resolution in the main scanning direction and the sub-scanning direction for conversion (resolution enhancement) into image data at the second resolution higher than the first resolution. Moreover, the light source modulation data generating part 3233 calculates a write start timing of the image data based on an output signal of a synchronization detection sensor (not illustrated) for each image forming station (K, C, M, Y stations). The light source modulation data generating part 3233 superimposes image dot data of each light source 2200 on the clock signal output from the clock generating part 3232 in accordance with the write start timing, and generates light source modulation data independent in each light source 2200 based on the information from the image processing unit 102. The light source modulation data generating part 3233 generate line-thinned image data having been subjected to the line thinning processing by setting image dots based on pattern information that matches each image section obtained by dividing pixels at the time of conversion (resolution enhancement) into the image data at the second resolution. The light source modulation data generating part 3233 refers to the tag information to control the light emission of the light source 2200 (power modulation control), and performs the line thinning processing.

The light source driving part 3234 receives a light source modulation signal according to the image data at the second resolution. The light source driving part 3234 drives corresponding one of the light sources 2200a, 2200b, 2200c, and 2200d according to an independent light source modulation signal for each color output from the light source modulation data generating part 3233. This enables the light source driving part 3234 to emit light from each of the light sources 2200a, 2200b, 2200c, and 2200d at an intensity according to the light source modulation signal.

The light source driving part 3234 drives the light sources 2200 (outputs a drive signal) based on a light source modulation signal (light source modulation pulse signal) from a strong exposure data generating unit 120 and drive current data (light source applied current data) from a drive current setting unit 130. Specifically, the light source driving part 3234 drives the light source 2200 to control the light emission of the light source 2200 based on a light source modulation signal that controls light emission of the light source 2200 according to line-thinned image data obtained by thinning each edge pixel of the line data and the character data included in the input image data by a first pixel width, and a drive current switching signal according to intensity information that includes a first intensity (normal intensity) to which a pixel not included in a set second pixel width of an edge portion of the line-thinned image data is exposed and a second intensity (high intensity) at which a pixel included in the second pixel width is exposed and which is higher than the first intensity where the second pixel width is set such that the ratio between the first pixel width and the second pixel width is constant. The ratio of the drive current, at which the light source 2200 is driven to emit light at the first intensity, to the drive current at which the light source 2200 is driven to emit light at the second intensity is preferably in a range between 1 to 1.5 and 1 to 2.

The functional configuration of the light source modulation data generating part 3233 will be explained in detail next with reference to FIG. 8.

As illustrated in FIG. 8, the light source modulation data generating part 3233 includes a resolution converting part 110, the strong exposure data generating part 120, and the drive current setting part 130.

The resolution converting part 110 includes a buffer memory part 111, a pattern matching part 112, and an image processing part 113. The image processing part 113 includes an image data generating part 114, a pixel width setting part 115, and an intensity information generating part 116.

The buffer memory part 111 acquires an image matrix being the image data and the tag information in an area including a target pixel and pixels around the target pixel. The buffer memory part 111 receives data of 2400 dpi/1 bit input from the image processing unit 102, stores the data corresponding to a plurality of main scanning lines, and transfers the stored data downstream in response to the reading from the image processing part 113 provided downstream. At this stage, the image data is described in a signal of 2400 dpi/1 bit. The output from the buffer memory part 111 is input to the pattern matching part 112.

The buffer memory part 111 stores 2-bit data (the high-order bit indicates the image data (CMYK) and the low-order bit indicates the tag information) at the first resolution (2400 dpi) input from the image processing unit 102. The buffer memory part 111 transfers the stored image data and tag information to the image processing part 113 in response to the reading from the image processing part 113 in the subsequent stage.

The pattern matching part 112 determines whether the target pixel is a pixel that forms a thin line and a character based on the arrangement of the image data and the tag information in the image matrix. Specifically, the pattern matching part 112 performs pattern detection for pixels as image processing targets using the image matrix based on the signal corresponding to image dots of, for example, 2400 dpi/1 bit. In this case, when there is the tag information indicating the attribute of the image data, the pattern matching part 112 performs pattern matching on a required image area based on the attribute of the image to perform detection. The attribute of the image indicates, for example, character, photo, and graphic. Thereafter, the pattern matching part 112 outputs the signal indicating pattern information to the image processing part 113.

The image processing part 113 includes the image data generating part 114, the pixel width setting part 115, and the intensity information generating part 116.

The image data generating part 114 generates line-thinned image data having been subjected to the line thinning processing for thinning an edge pixel of the image data by the first pixel width. The first pixel width will be explained in detail later.

The image data generating part 114 sequentially selects a target pixel from the image data at the first resolution and converts the image data into image data at a higher resolution for each target pixel. Specifically, the image data generating part 114 performs resolution conversion processing for converting the image data into image data of the pattern determined according to an output of the pattern matching part 112 at a high resolution. More specifically, the image data generating part 114 converts the pixel detected by the pattern matching into a pixel at a high resolution and converts the image data of 2400 dpi/4 bits into data of 4800 dpi/1 bit, thus dividing into 2×2 areas. By setting an image dot based on the pattern information that matches each of the image sections obtained by dividing the pixels, the image data generating part 114 generates image data having been subjected to the line thinning processing (line-thinned image data).

Moreover, the image data generating part 114 sequentially selects a target pixel from the input image data at the first resolution, converts the image data at the first resolution into image data at the second resolution higher than the first resolution, and generates line-thinned image data having been subjected to the line thinning processing.

The pixel width setting part 115 sets the second pixel width in the edge portions of the line-thinned image data generated by the image data generating part 114 such that the ratio between the first pixel width and the second pixel width is constant. The details of the first pixel width and the second pixel width will be explained later. The first pixel width and the second pixel width may be set in advance.

When the proportion of the second intensity (high intensity) to the first intensity (normal intensity) is 2 times, the pixel width setting part 115 sets the ratio between the first pixel width and the second pixel width so as to be 1 to 1. When the proportion of the second intensity (high intensity) to the first intensity (normal intensity) is 1.5 times, the pixel width setting part 115 sets the ratio between the first pixel width and the second pixel width so as to be 1 to 2.

The pixel width setting part 115 sets the ratio between the first pixel width and the second pixel width according to the proportion of the second intensity to the first intensity.

The intensity information generating part 116 generates intensity information that includes the first intensity (normal intensity) to which a pixel not included in the second pixel width set by the pixel width setting part 115 is exposed and the second intensity (high intensity) at which a pixel included in the second pixel width is exposed and which is higher than the first intensity. The second intensity (high intensity) has a plurality of intensity levels. For example, when the first intensity (normal intensity) is 100%, the second intensity (high intensity) is higher than 100%, and is 125%, 150%, 200%, 250%, or 300%, for example.

The intensity information generating part 116 also generates power modulation information (power modulation control pulse signal information).

The intensity information generating part 116 generates intensity information such that the total amount of light to which all the pixels of the image data before the line thinning processing is performed are exposed at the first intensity (normal intensity) is equal to the sum of the total amount of light to which all the pixels not included in the second pixel width are exposed at the first intensity (normal intensity) and the total amount of light to which all the pixels included in the second pixel width are exposed at the second intensity (high intensity).

The intensity information generating part 116 generates intensity information such that the proportion of the second intensity (high intensity) to the first intensity (normal intensity) is in a range from 1 time to 3 times, preferably in a range from 1.5 times to 2 times.

The image processing part 113 outputs the generated image data (line-thinned image data) and the power modulation information (power modulation control pulse signal information) to the strong exposure data generating part 120.

The strong exposure data generating part 120 generates a light source modulation signal (light source modulation pulse signal) for controlling light emission of the light source 2200 according to the line-thinned image data and a drive current switching signal (power modulation control pulse signal) based on the intensity information generated by the intensity information generating part 116.

The strong exposure data generating part 120 includes a pulse generating part 121. The pulse generating part 121 serially converts the image information (line-thinned image data) and the power modulation information (power modulation control pulse signal) based on high frequency clock, and outputs them as a light source modulation pulse signal and a power modulation control pulse signal. The light source modulation pulse signal is output to the light source driving part 3234. The power modulation control pulse signal functions as a switching signal (drive current switching signal) of a selector 134 for selecting light source applied current data (drive current data) used to set a normal intensity and light source applied current data (drive current data) used to set a high intensity. The power modulation control pulse signal corresponds to "drive current switching signal" according to the appended claims.

The drive current setting part 130 switches drive current data for setting the first intensity (normal intensity) or the second intensity (high intensity) to be applied to the light source 2200 based on the drive current switching signal (power modulation control pulse signal) and outputs the drive current data. In other words, the drive current setting part 130 performs light source applied current modulation (power modulation) for changing an exposure intensity with respect to the thin line and the character.

The drive current setting part 130 includes a power modulation value holding part 131, a power modulation current setting part 132, a normal current setting part 133, and the selector 134.

The power modulation value holding part 131 holds a magnification (power modulation value) by which the first intensity (normal intensity) data is magnified to the second intensity (high intensity) data. The power modulation current setting part 132 magnifies the first intensity (normal intensity) data by referring to the magnification (power modulation value) held by the power modulation value holding part 131 to set the second intensity (high intensity) data. The normal current setting part 133 sets the first intensity (normal intensity) data. The selector 134 switches the drive current data for setting the first intensity (normal intensity) or the second intensity (high intensity) to be applied to the light source 2200 based on the drive current switching signal (power modulation control pulse signal) out of a plurality of pieces of light source applied current data output from the drive current setting part 130, and outputs the drive current data.

The details of the functional configuration of the light source driving part 3234 will be explained next with reference to FIG. 9. As illustrated in FIG. 9, the light source driving part 3234 includes a digital to analog converter (DAC) 141 and a switch 142. In the example of FIG. 9, although a single laser (LD) is illustrated as an example of the light source 2200, the light source is not limited thereto. The light source 2200 may be, for example, laser diode array (LDA), or may be vertical cavity surface emitting laser (VCSEL).

In the example of FIG. 9, the light source (LD) 2200 includes a current source that applies a current in the forward direction of the light source 2200 based on the light source modulation pulse signal. The applied current is configured such that a predetermined current can be set digitally by DAC code based on the light source applied current data. The switch 142 controls light emission of the light source 2200 with a desired lighting pattern by on/off controlling the current source based on the light source modulation pulse signal.

Figure 10:
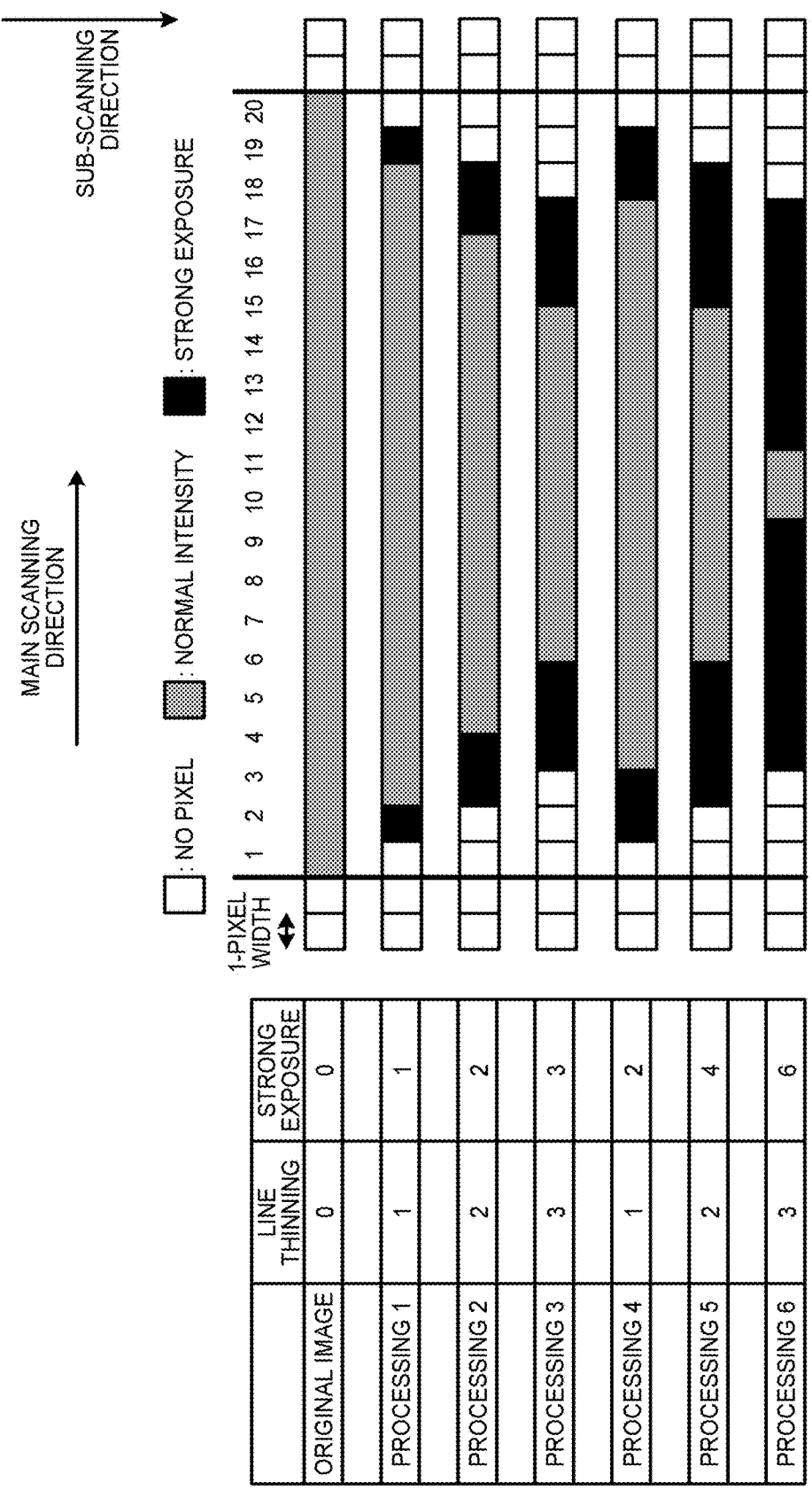
FIG. 10 is a diagram for explaining a pixel width of a pixel to be thinned and a pixel width of a pixel to be strongly exposed.

The line thinning processing and the exposure intensity of a pixel will be explained next with reference to FIG. 10 to FIG. 17. FIG. 10 is a diagram for explaining a pixel width of a pixel to be thinned and a pixel width of a pixel to be strongly exposed.

A square illustrated in FIG. 10 represents one pixel. The horizontal direction of the image indicates a main scanning direction of the optical scanning device 2010, and the vertical direction of the image indicates a sub-scanning direction. The size of one pixel is, for example, 1200 dpi, 2400 dpi, or 4800 dpi in each of the main scanning direction and the sub-scanning direction, based on, for example, a production printing machine as one example.

For example, the diagram illustrated in FIG. 10 corresponding to an original image of a first row represents a model diagram obtained by extracting pixels arranged horizontally in the main scanning direction from a vertical line in the sub-scanning direction. The example of FIG. 10 is a model diagram obtained by extracting pixels in a width of one pixel in the sub-scanning direction from the vertical line whose pixel width is 20 pixels in the main scanning direction. A white square represents "no image", a gray square represents that an exposure intensity of the pixel is "normal intensity", and a black square represents that an exposure intensity of the pixel is "strong exposure (high intensity)". In other words, the original image in the first row is image data in which 20 pixels (dot) having the normal intensity are arranged in positions indicated by 1 to 20. The normal intensity is an intensity when strong exposure processing is off. For example, when the normal intensity is 100%, a strong exposure intensity (high intensity) is more than 100% and is 125%, 150%, 200%, 250%, or 300%, for example. The normal intensity corresponds to "first intensity" according to the appended claims, and the strong exposure intensity or the high intensity corresponds to "second intensity" according to the appended claims.

Numerical values illustrated in the column of Line thinning and in the column of Strong exposure represent a pixel width (number of pixels). Specifically, the numerical values represent a pixel width (number of pixels) to be subjected to the line thinning processing and a pixel width (number of pixels) to be subjected to the strong exposure after the line thinning processing. For example, Processing 1 in a second row represents that a pixel width to be subjected to the line thinning processing is one pixel and a pixel width to be subjected to the strong exposure is one pixel. Processing 2 in a third row represents that a pixel width to be subjected to the line thinning processing is two pixels and a pixel width to be subjected to the strong exposure is two pixels. Processing 3 in a fourth row represents that a pixel width to be subjected to the line thinning processing is three pixels and a pixel width to be subjected to the strong exposure is three pixels. Processing 4 in a fifth row represents that a pixel width to be subjected to the line thinning processing is one pixel and a pixel width to be subjected to the strong exposure is two pixels. Processing 5 in a sixth row represents that a pixel width to be subjected to the line thinning processing is two pixels and a pixel width to be subjected to the strong exposure is four pixels. Processing 6 in a seventh row represents that a pixel width to be subjected to the line thinning processing is three pixels and a pixel width to be subjected to the strong exposure is six pixels. Hereinafter, for example, when the pixel width is three pixels, it is described as "3-pixel width". The pixel width to be subjected to the line thinning processing corresponds to "first pixel width" according to the appended claims, and the pixel width to be subjected to the strong exposure after the line thinning processing corresponds to "second pixel width" according to the appended claims.

Line thinning processing 1 to 6 according to the present embodiment will be explained below with reference to FIG. 10. First of all, the line thinning processing indicates image processing in which a pixel in an edge portion of the input original image data is thinned by a first pixel width, and the first pixel width is arbitrarily set. The line thinning processing is simply described as "Processing" in FIG. 10.

Processing 1 represents an example in which the line thinning processing for changing the intensity of one pixel in the edge portions of the image data from the normal intensity to its off state is performed on the pixels of a 20-pixel width in the main scanning direction and the intensity of the one pixel in the edge portions of the line-thinned image data newly generated through the line thinning processing is changed to the strong exposure light more than the normal intensity.

Processing 2 represents an example in which the line thinning processing for changing the intensity of two pixels in the edge portions of the image data from the normal intensity to their off state is performed on the pixels of the 20-pixel width in the main scanning direction and the intensity of the two pixels in the edge portions of the line-thinned image data newly generated through the line thinning processing is changed to the strong exposure light more than the normal intensity.

Processing 3 represents an example in which the line thinning processing for changing the intensity of three pixels in the edge portions of the image data from the normal intensity to their off state is performed on the pixels of the 20-pixel width in the main scanning direction and the intensity of the three pixels in the edge portions of the line-thinned image data newly generated through the line thinning processing is changed to the strong exposure light more than the normal intensity.

In other words, Processing 1 to Processing 3 represent examples of setting each of the pixel widths such that the ratio between the pixel width (first pixel width) to be subjected to the line thinning processing in the edge portions of the input original image data and the pixel width (second pixel width) to be subjected to the strong exposure in the edge portions of the line-thinned image data after the line thinning processing is 1 to 1 (1:1).

Then, Processing 4 represents an example in which the line thinning processing for changing the intensity of one pixel in the edge portions of the image data from the normal intensity to its off state is performed on the pixels of the 20-pixel width in the main scanning direction and the intensity of the two pixels in the edge portions of the line-thinned image data newly generated through the line thinning processing is changed to the strong exposure light more than the normal intensity.

Processing 5 represents an example in which the line thinning processing for changing the intensity of two pixels in the edge portions of the image data from the normal intensity to their off state is performed on the pixels of the 20-pixel width in the main scanning direction and the intensity of four pixels in the edge portions of the line-thinned image data newly generated through the line thinning processing is changed to the strong exposure light more than the normal intensity.

Processing 6 represents an example in which the line thinning processing for changing the intensity of three pixels in the edge portions of the image data from the normal intensity to their off state is performed on the pixels of the 20-pixel width in the main scanning direction and the intensity of six pixels in the edge portions of the line-thinned image data newly generated through the line thinning processing is changed to the strong exposure light more than the normal intensity.

In other words, Processing 4 to Processing 6 represent examples of setting each of the pixel widths such that the ratio between the pixel width (first pixel width) to be subjected to the line thinning processing in the edge portions of the input original image data and the pixel width (second pixel width) to be subjected to the strong exposure in the edge portions of the line-thinned image data after the line thinning processing is 1 to 2 (1:2).

The pixel width setting part 115 sets the ratio between the first pixel width and the second pixel width according to the proportion of the second intensity to the first intensity. Specifically, for example, when the proportion of the second intensity (high intensity) to the first intensity (normal intensity) is two times, the pixel width setting part 115 sets the ratio between the first pixel width and the second pixel width so as to be 1 to 1. Moreover, when the proportion of the second intensity (high intensity) to the first intensity (normal intensity) is 1.5 times, the pixel width setting part 115 sets the ratio between the first pixel width and the second pixel width so as to be 1 to 2.

In this way, by setting the ratio, to be constant, between the pixel width (first pixel width) to be subjected to the line thinning processing and the pixel width (second pixel width) to be subjected to the strong exposure, it is possible to clearly reproduce a thin line and a character of small size. It is also possible to improve the reproducibility of a thin line and a small point character, such as the thinning of lines and the thinning of characters.

Figure 11:
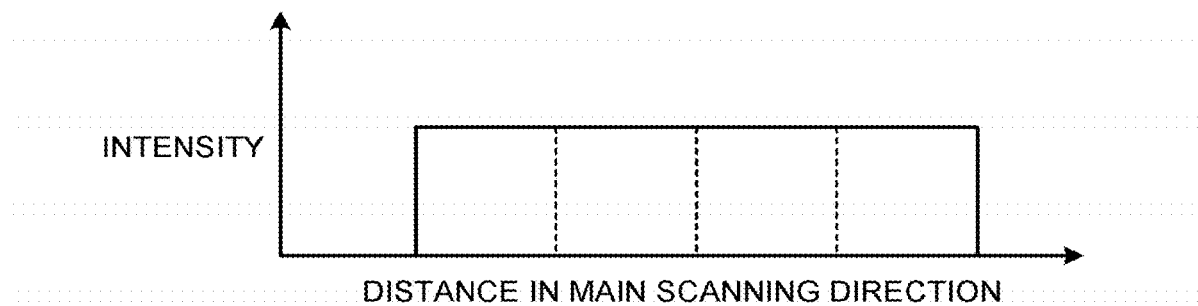
FIG. 11 is a diagram of an intensity at each position of a photoconductor drum in a main scanning direction in a related art.
Figure 12:
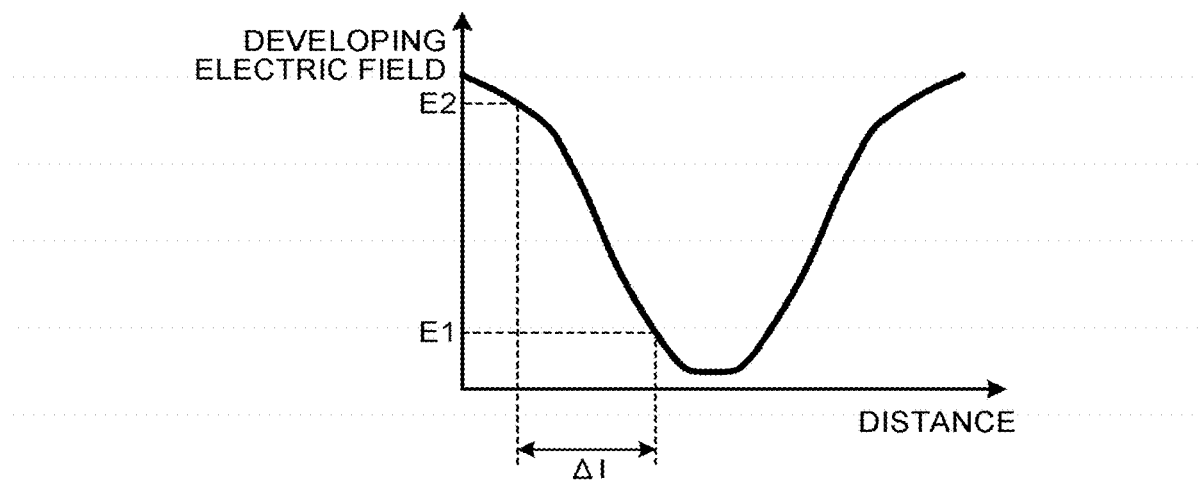
FIG. 12 is a diagram of a change of a developing electric field on the photoconductor drum in the main scanning direction in the related art.
Figure 13:
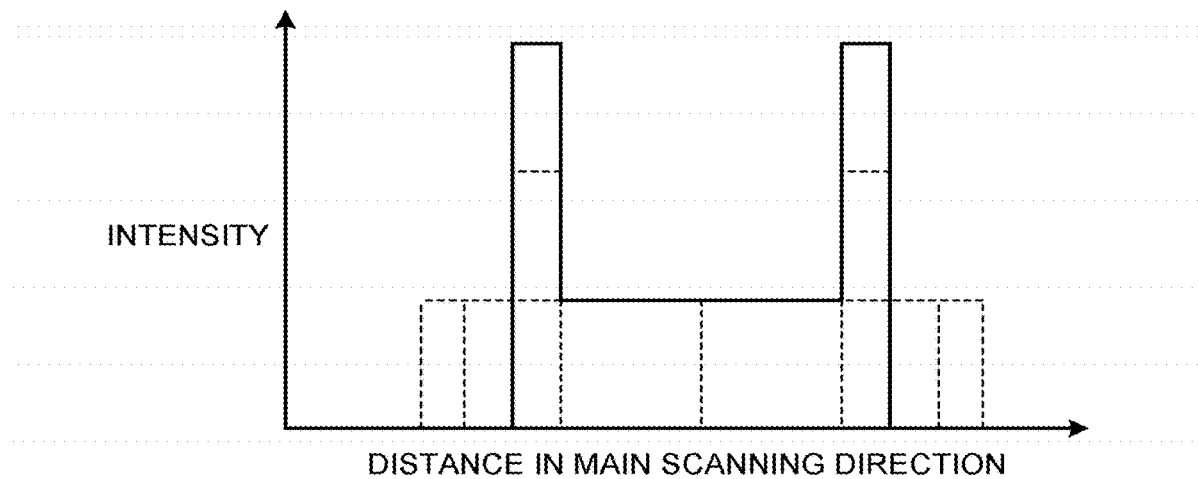
FIG. 13 is a diagram of an intensity at each position of a photoconductor drum in the main scanning direction according to the present embodiment.
Figure 14:
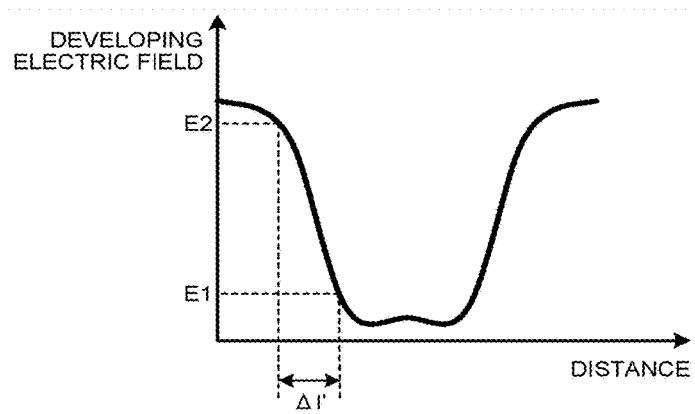
FIG. 14 is a diagram of a change of the developing electric field on the photoconductor drum in the main scanning direction according to the present embodiment.

FIG. 11 is a diagram of an intensity at each position of a photoconductor drum in the main scanning direction in a related art. FIG. 12 is a diagram of a change in a developing electric field on the photoconductor drum in the main scanning direction in the related art. FIG. 13 is a diagram of an intensity at each position of the photoconductor drum in the main scanning direction according to the present embodiment. FIG. 14 is a diagram of a change in the developing electric field on the photoconductor drum in the main scanning direction according to the present embodiment.

In FIG. 11 and FIG. 13, the vertical axis represents an exposure intensity, and the horizontal axis represents a distance in the main scanning direction. Each square (regular tetragon) in FIG. 11 and FIG. 13 represents one pixel. A vertically elongated square (rectangle) in FIG. 13 represents one pixel by three squares. In FIG. 12 and FIG. 14, the vertical axis represents the strength of a developing electric field, and the horizontal axis represents a distance in the main scanning direction.

The example of FIG. 11 represents a case of scanning the photoconductor drum 2030 in the main scanning direction with an optical waveform of a constant intensity (normal intensity), and the example of FIG. 12 represents the optical waveform when the photoconductor drum 2030 is scanned at that time and the change of the developing electric field in the main scanning direction. As illustrated in FIG. 12, when the photoconductor drum 2030 is scanned in the main scanning direction with the optical waveform of a constant intensity, a distance $\Delta 1$ in the main scanning direction in an area (area between E1 and E2) of a weak electric field where toner adhesion is unstable is widened. In this case, the area in which toner adhesion is unstable is large and the amount of toner adhesion is made uneven, which causes uneven density to occur in an image on the recording sheet. In addition, for example, a thin line and a fine character (small point character) may be blurred due to the unevenness of the toner adhesion in edge portions of the line and the character, and the sharpness is thereby reduced.

The example of FIG. 13 represents a case of scanning the photoconductor drum 2030 in the main scanning direction with an optical waveform of the intensity according to the present embodiment, and the example of FIG. 14 represents the optical waveform when the photoconductor drum 2030 is scanned at that time and the change of the developing electric field in the main scanning direction. As illustrated in FIG. 13, in the present embodiment, the light emission intensity of a semiconductor laser (LD 2200) when a pixel in the edge portion is to be formed is made larger than the light emission intensity when a normal pixel is to be formed, so that the change in the developing electric field is made steep. The reason that the pixel widths at both edge portions are thinned and each intensity of the pixel edge portions is increased, in FIG. 13 as compared with FIG. 11, is to cause the total amount of light to which all the pixels are exposed to be the same as that of FIG. 11. Moreover, when the light emission intensity is controlled as illustrated in FIG. 13, a distance $\Delta 1'$ in the main scanning direction of the area (area between E1 and E2) of the weak electric field where toner adhesion is unstable can be made narrower as $\Delta 1' < \Delta 1$, and the area in which the toner adhesion is unstable can be made narrower. Therefore, according to the exposure processing of the present embodiment, because the uneven toner adhesion can be reduced, which makes it possible to improve the stability of toner density and to reduce blurring in the edge portions of a line drawing such as a thin line and a fine character (small point character), thus improving the sharpness. Moreover, according to the present embodiment, because the pulse width is thinned, it is possible to maintain appropriate exposure energy without a significant increase in the total amount of exposure energy. In addition, according to the present embodiment, it is possible to suppress the occurrence of density unevenness of an image due to the change in the developing electric field of the photoconductor drum 2030 in the main scanning direction and improve the reproducibility of the image.

Figure 15:
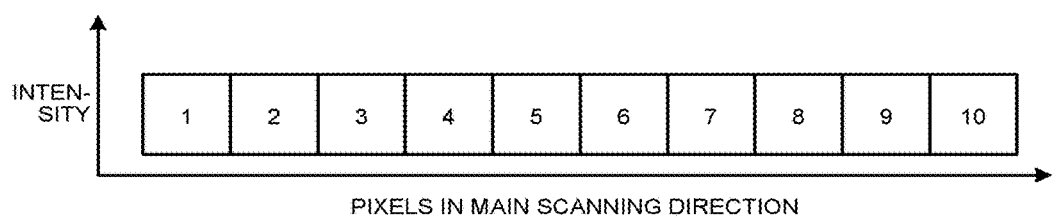
FIG. 15 is a diagram for explaining a relationship between line thinning processing and an exposure intensity of a pixel.
Figure 16:
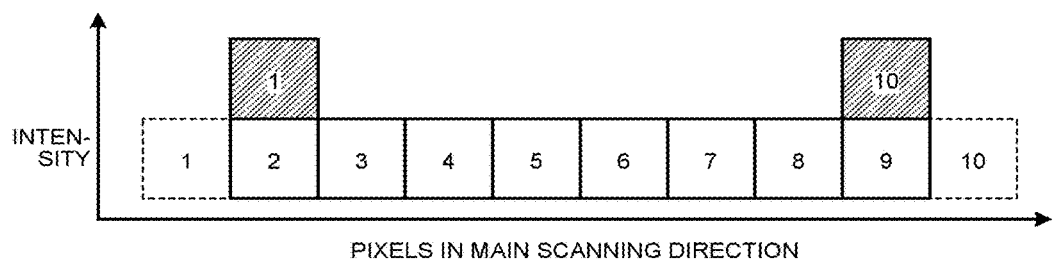
FIG. 16 is a diagram for explaining a relationship between line thinning processing and an exposure intensity of a pixel.
Figure 17:
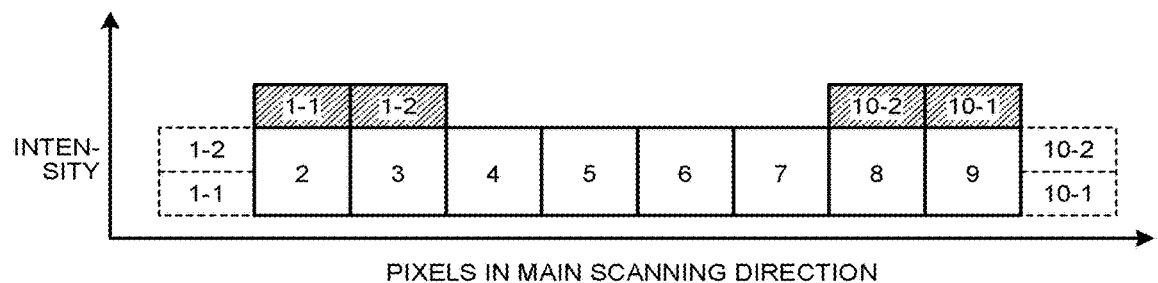
FIG. 17 is a diagram for explaining a relationship between line thinning processing and an exposure intensity of a pixel.

FIG. 15 to FIG. 17 are diagrams for explaining a relationship between line thinning processing and an exposure intensity of a pixel. In FIG. 15 to FIG. 17, the vertical axis represents an exposure intensity, and the horizontal axis represents a pixel in the main scanning direction. The pixels in the main scanning direction represent image data in which 10 pixels are arranged at positions indicated by 1 to 10.

The example of FIG. 15 is a diagram corresponding to the original image in the first row as illustrated in FIG. 10. The total amount (integrated light amount) of exposure light to which the first pixel to the tenth pixel are exposed at the normal intensity becomes 100-light amount because there are 10 pixels in all, for example, when it is assumed that a pixel is exposed to a 10-light amount. Hereinafter, it will be explained under the same assumption.

The example of FIG. 16 is a diagram corresponding to Processing 1 in the second row as illustrated in FIG. 10. Processing 1 represents that a pixel width (first pixel width) to be subjected to the line thinning processing is one pixel and a pixel width (second pixel width) to be subjected to the strong exposure is one pixel. As illustrated in FIG. 16, because one pixel (first pixel width) in the edge portions of the image data is subjected to the line thinning processing for changing from the normal intensity to the Off-state, the total amount of light (integrated light amount) to which the third pixel to the eighth pixel are exposed at the normal intensity is 60-light amount. Because one pixel (second pixel width) in the edge portions of the line-thinned image data newly generated through the line thinning processing is subjected to strong exposure (high intensity) higher than the normal intensity, the total amount of light (integrated light amount) at positions of the second pixel and the ninth pixel is 40-light amount. In other words, the second pixel and the ninth pixel in new edge portions are exposed to a light amount (high intensity) increased by the light amount to which the first pixel and the tenth pixel in the edge portions are exposed, which are deleted through the line thinning processing. Therefore, the total amounts of light for all the pixels are the same as each other. In other words, when the normal intensity is set to 1 (100%) and if the strong exposure intensity is set to be twice (200%), the total amounts of the light for all the pixels before and after the line thinning processing can be the same as each other. Therefore, even when the exposure intensity of pixels in the edge portions is increased together with the line thinning processing, the total amount of energy for the image formation is not increased.

The example of FIG. 17 is a diagram corresponding to Processing 4 in the fifth row as illustrated in FIG. 10. Processing 4 represents that a pixel width (first pixel width)

to be subjected to the line thinning processing is one pixel and a pixel width (second pixel width) to be subjected to the strong exposure is two pixels. As illustrated in FIG. 17, because one pixel (first pixel width) in the edge portions of the image data is subjected to the line thinning processing for changing from the normal intensity to the Off state, the total amount of light (integrated light amount) to which the fourth pixel to the seventh pixel are exposed at the normal intensity is 40-light amount. Because two pixels (second pixel width) in the edge portions of the line-thinned image data newly generated through the line thinning processing are subjected to strong exposure (high intensity) higher than the normal intensity, the total amount of light (integrated light amount) at positions of the second pixel, the third pixel, the eighth pixel, and the ninth pixel is 60-light amount. In other words, the second pixel, the third pixel, the eighth pixel, and the ninth pixel in new edge portions are exposed to a light amount (high intensity) increased by the light amount to which pixels 1-1 and 1-2 and pixels 10-1 and 10-2 in the edge portions are exposed, which are deleted through the line thinning processing. Therefore, the total amounts of light for all the pixels are the same as each other. In other words, when the normal intensity is set to 1 (100%) and if the strong exposure intensity is set to be 1.5 times (150%), the total amounts of light for all the pixels before and after the line thinning processing can be the same as each other. In other words, even when the exposure intensity of pixels in the edge portions is increased together with the line thinning processing, the total amount of energy for the image formation is not increased.

In this way, in the present embodiment, the control is performed to set the ratio between the first pixel width and the second pixel width according to the proportion of the second intensity (high intensity) to the first intensity (normal intensity) such that the total amount of light to which all the pixels of the image data before the line thinning processing is performed are exposed at the first intensity (normal intensity) is equal to the sum of the total amount of light to which all the pixels not included in the second pixel width are exposed at the first intensity (normal intensity) and the total amount of light to which all the pixels included in the second pixel width are exposed at the second intensity (high intensity).

Specifically, for example, when the proportion of the second intensity (high intensity) to the first intensity (normal intensity) is 2 times, the pixel width setting part 115 sets the ratio between the first pixel width and the second pixel width so as to be 1 to 1. When the proportion of the second intensity (high intensity) to the first intensity (normal intensity) is 1.5 times, the pixel width setting part 115 sets the ratio between the first pixel width and the second pixel width so as to be 1 to 2.

In the present embodiment, the exposure intensity level is set such that the total amounts of light before and after the line thinning processing are the same as each other, which makes it possible to perform image formation in which the change in the image density is suppressed even if the strong exposure processing is performed together with the line thinning processing, and also to make clear the edge portion of an image that is easily blurred, such as a thin line and a fine character (small point character). Therefore, according to the present embodiment, the thin line and the fine character can be sharply reproduced, which makes it possible to perform image formation with high reproducibility of characters.

Figure 18:
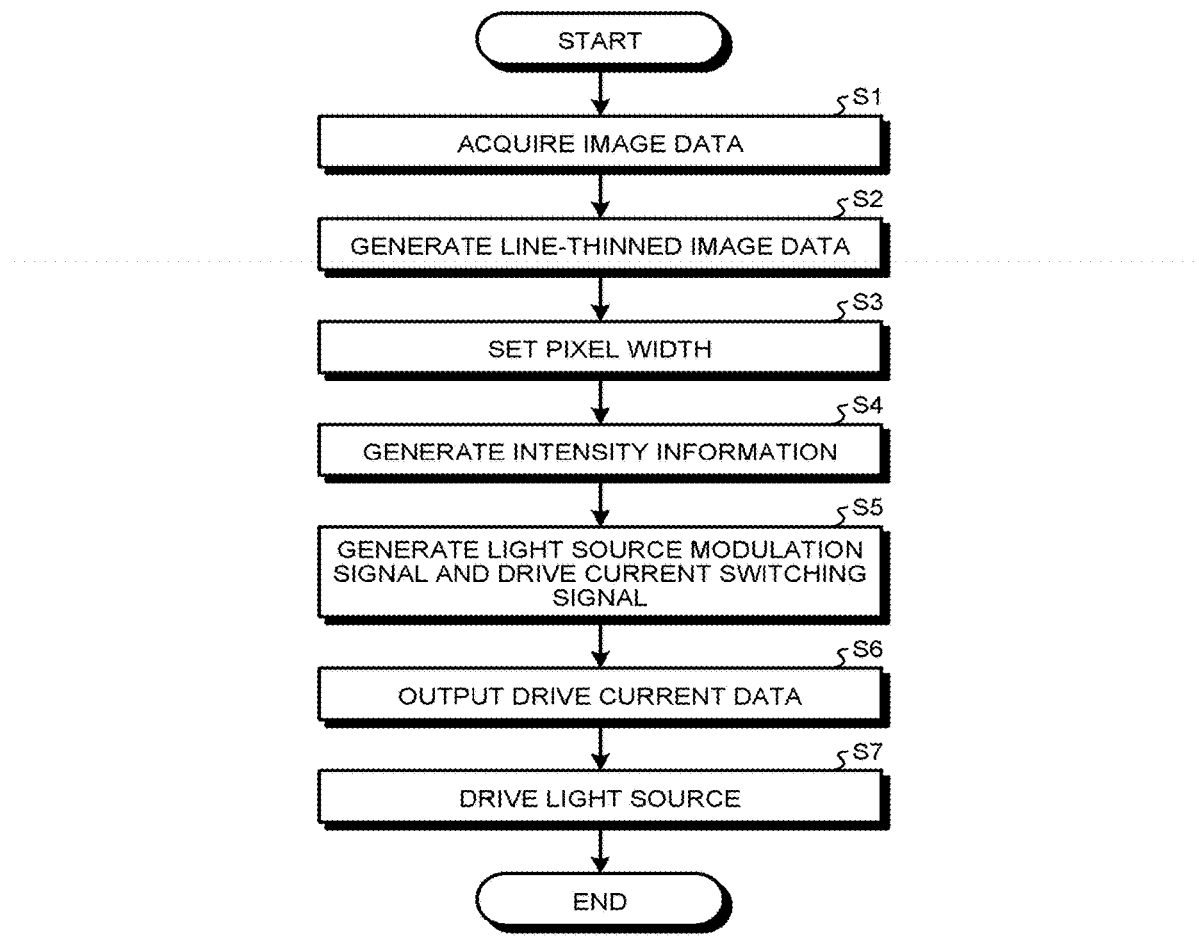
FIG. 18 is a flowchart for explaining a processing operation of the light source drive control device.

The processing operation of the light source drive control device according to the present embodiment will be explained next. FIG. 18 is a flowchart for explaining the processing operation of the light source drive control device.

First of all, the resolution converting part 110 acquires image data input from the image processing unit 102 provided upstream (Step S1). Then, the resolution converting part 110 sequentially selects a target pixel from the acquired image data, and converts the image data into image data with high resolution for each target pixel. At this time, the image data generating part 114 generates line-thinned image data obtained by performing the line thinning processing for thinning an edge pixel in the image data by the first pixel width (Step S2).

Then, the pixel width setting part 115 sets a second pixel width at the edge portion of the converted line-thinned image data such that the ratio between the first pixel width and the second pixel width is constant (Step S3). The first pixel width and the second pixel width may be set in advance.

The intensity information generating part 116 generates the intensity information that includes the first intensity (normal intensity) to which a pixel not included in the set second pixel width is exposed and the second intensity (high intensity) at which a pixel included in the second pixel width is exposed and which is higher than the first intensity (Step S4).

The strong exposure data generating part 120 generates a light source modulation signal (light source modulation pulse signal) for controlling light emission of the light source 2200 according to the line-thinned image data and a drive current switching signal (power modulation control pulse signal) based on the intensity information generated by the intensity information generating part 116 (Step S5).

The drive current setting part 130 switches drive current data (light source applied current data), by the selector 134, for setting the first intensity (normal intensity) or the second intensity (high intensity) to be applied to the light source 2200 based on the drive current switching signal (power modulation control pulse signal) input from the strong exposure data generating part 120, and outputs the drive current data (Step S6).

The light source driving part 3234 drives the light sources 2200 based on the light source modulation signal (light source modulation pulse signal) input from the strong exposure data generating part 120 and based on the drive current data (light source applied current data) input from the drive current setting part 130 (Step S7).

By performing the processing operations described above, the light source drive control device 103 performs the resolution conversion processing, the line thinning processing, and the exposure processing, and controls the light source 2200 of the optical scanning device 2010 to form a latent image, which makes it possible to clearly reproduce the thin line and the fine character.

Specific examples of performing the line thinning processing and the exposure processing according to the present embodiment will be explained next with reference to FIG. 19 to FIG. 24.

Figure 19:
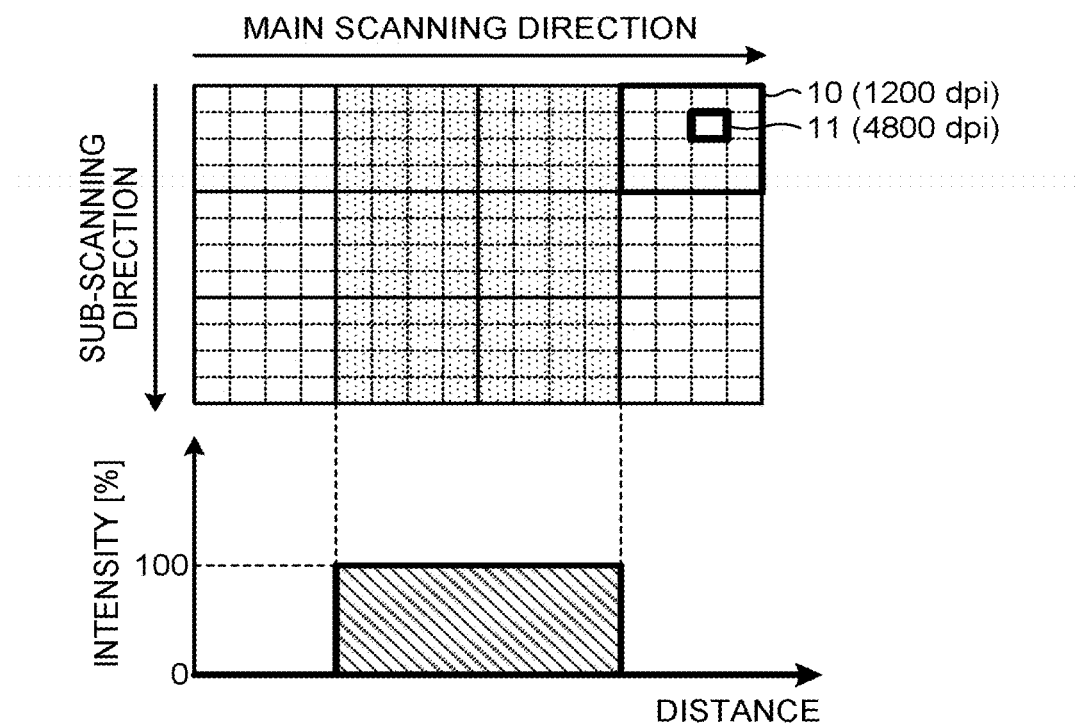
FIG. 19 is a diagram for explaining a relationship between a pixel width obtained by forming a thin line through normal processing and an intensity.

FIG. 19 is a diagram for explaining a relationship between a pixel width obtained by forming a thin line through normal processing and an intensity. In the upper figure of FIG. 19, the horizontal direction of the image represents the main scanning direction of the optical scanning device 2010, and the vertical direction of the image represents the sub-scanning direction. FIG. 19 is a model diagram obtained by extracting pixels in a three-pixel (1200 dpi) line in the sub-scanning direction from a vertical line image whose pixel width in the main scanning direction is two pixels (1200 dpi). A large square 10 represents a pixel of 1200 dpi and a small square 11 represents a high resolution pixel of 4800 dpi. In the lower figure of FIG. 19, the vertical axis represents an exposure intensity, and the horizontal axis represents a distance in the main scanning direction. This figure represents that two pixels (1200 dpi) are scanned (exposed) on the photoconductor drum 2030 in the main scanning direction at a predetermined normal intensity (100%).

Figure 20:
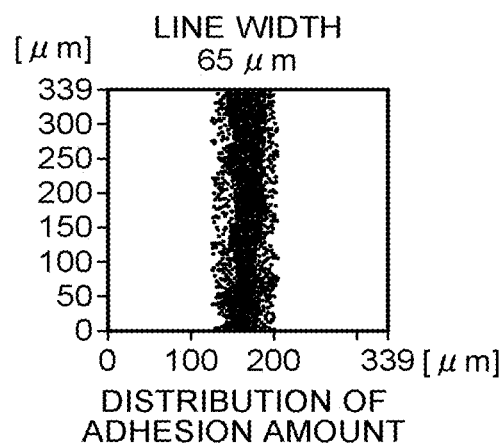
FIG. 20 is a diagram of a thin line image formed by the normal processing.

FIG. 20 is a diagram of a thin line image formed by the normal processing. In FIG. 20, the horizontal axis and the vertical axis represent a distribution of toner adhesion amount in the main scanning direction and the sub-scanning direction. In the example of FIG. 20, the normal processing explained in FIG. 19 is performed and the exposure is performed such that an assumed line width is 42 µm. However, the actually formed line width is 65 µm, which is thicker than the assumed line width.

Figure 21:
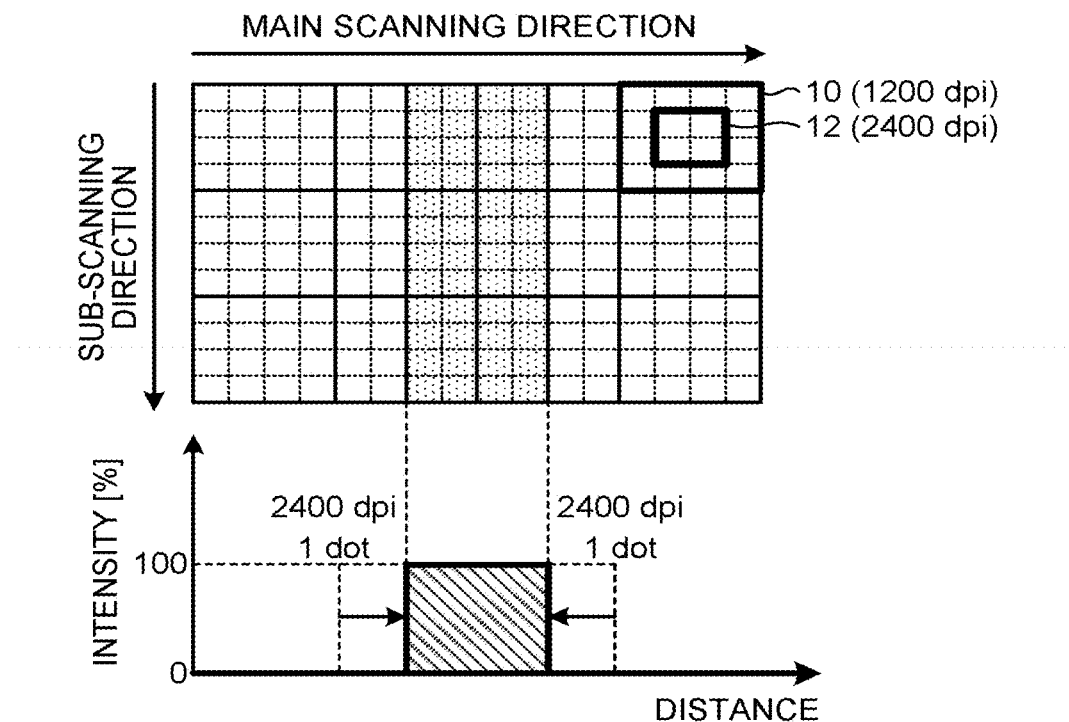
FIG. 21 is a diagram for explaining a relationship between a pixel width obtained by forming a thin line only through line thinning processing and an intensity.

FIG. 21 is a diagram for explaining a relationship between a pixel width obtained by forming a thin line only through line thinning processing and an intensity. In the upper figure of FIG. 21, the horizontal direction of the image represents the main scanning direction of the optical scanning device 2010, and the vertical direction of the image represents the sub-scanning direction. FIG. 21 is a model diagram obtained by extracting pixels in a three-pixel (1200 dpi) line in the sub-scanning direction from a vertical line image whose pixel width in the main scanning direction is two pixels (2400 dpi). The large square 10 represents the pixel of 1200 dpi and a small square 12 represents a high resolution pixel of 2400 dpi. In the lower figure of FIG. 21, the vertical axis represents an exposure intensity, and the horizontal axis represents a distance in the main scanning direction. This figure represents that two pixels (2400 dpi) are scanned (exposed) on the photoconductor drum 2030 in the main scanning direction at the predetermined normal intensity (100%). In other words, this figure represents that the vertical line image whose pixel width in the main scanning direction illustrated in FIG. 19 is two pixels (1200 dpi) is subjected to the line thinning processing for thinning each of the both edges of the image by one pixel (2400 dpi) and is exposed at the normal intensity (100%). That is, this figure is obtained by performing only the line thinning processing.

Figure 22:
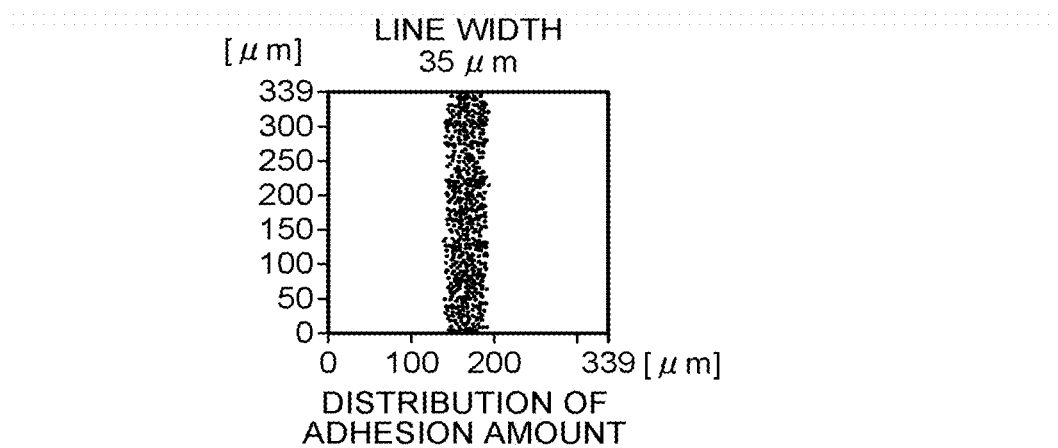
FIG. 22 is a diagram of a thin line image formed only through the line thinning processing.

FIG. 22 is a diagram of a thin line image formed only through the line thinning processing. In FIG. 22, the horizontal axis and the vertical axis represent a distribution of toner adhesion amount in the main scanning direction and the sub-scanning direction. In the example of FIG. 22, the line thinning processing explained in FIG. 21 is performed and the exposure is performed such that an assumed line width is 42 µm. However, the actually formed line width is 35 µm, and blurring occurs due to uneven toner adhesion in the edge portion.

Figure 23:
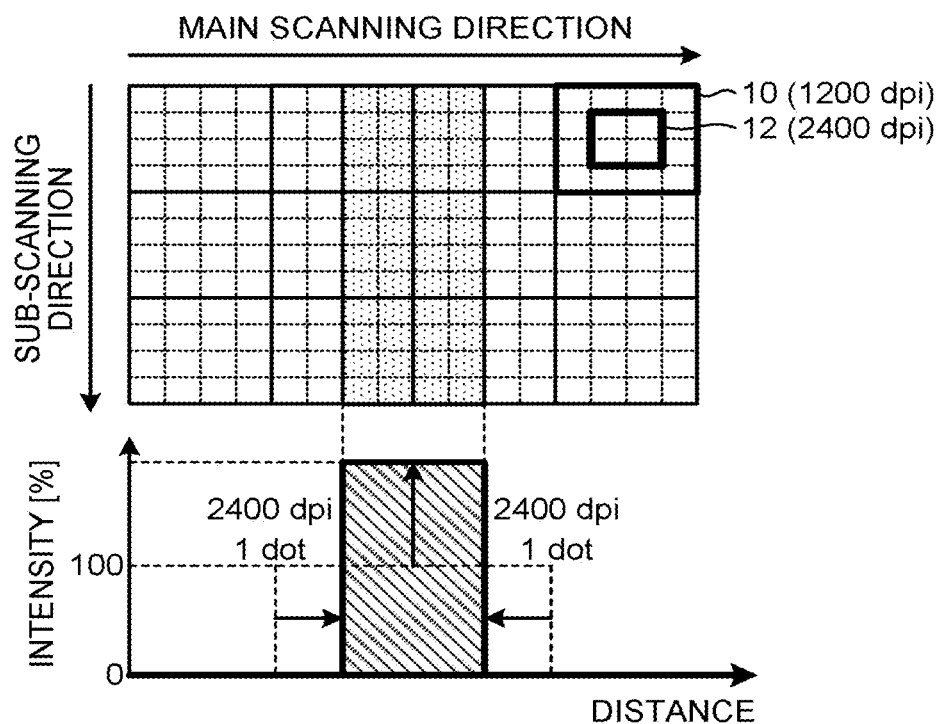
FIG. 23 is a diagram for explaining a relationship between a pixel width obtained by forming a thin line through the line thinning processing and exposure processing according to the present embodiment and an intensity.

FIG. 23 is a diagram for explaining a relationship between a pixel width obtained by forming a thin line through the line thinning processing and the exposure processing according to the present embodiment and an intensity. In the upper figure of FIG. 23, the horizontal direction of the image represents the main scanning direction of the optical scanning device 2010, and the vertical direction of the image represents the sub-scanning direction. FIG. 23 is a model diagram obtained by extracting pixels in a three-pixel (1200 dpi) line in the sub-scanning direction from a vertical line image whose pixel width in the main scanning direction is two pixels (2400 dpi). The large square 10 represents the pixel of 1200 dpi and the small square 12 represents the high resolution pixel of 2400 dpi. In the lower figure of FIG. 23, the vertical axis represents an exposure intensity, and the horizontal axis represents a distance in the main scanning direction. This figure represents that two pixels (2400 dpi) are scanned (exposed) on the photoconductor drum 2030 in the main scanning direction at a strong exposure intensity (200%). In other words, this figure represents that the vertical line image whose pixel width in the main scanning direction illustrated in FIG. 19 is two pixels (1200 dpi) is subjected to the line thinning processing for thinning each of the both edges of the image by one pixel (2400 dpi) and is exposed at the strong exposure intensity (200%). That is, this figure is obtained by performing the line thinning processing and the strong exposure processing.

Figure 24:
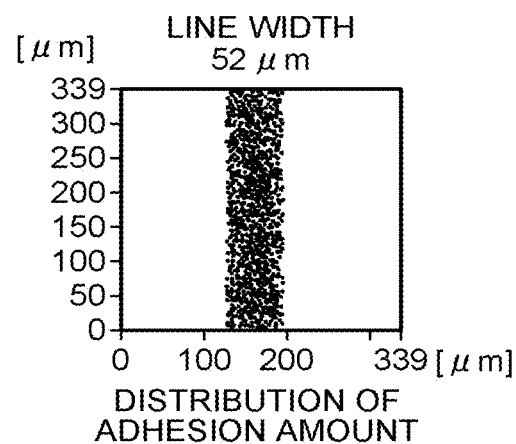
FIG. 24 is a diagram of a thin line image formed through the line thinning processing and the exposure processing according to the present embodiment.

FIG. 24 is a diagram of a thin line image formed through the line thinning processing and the exposure processing according to the present embodiment. In FIG. 24, the horizontal axis and the vertical axis represent a distribution of toner adhesion amount in the main scanning direction and the sub-scanning direction. In the example of FIG. 24, the line thinning processing explained in FIG. 23 is performed and the strong exposure is applied such that an assumed line width is 42 µm. However, the actually formed line width is 52 µm, and the thin line is clearly formed without uneven toner adhesion in the edge portion.

Thus, by performing the line thinning processing and the exposure processing using the light source drive control device 103 according to the present embodiment, it is possible to achieve advantageous effects that thin lines and characters of small size can be clearly reproduced.

The embodiments according to the present invention have been explained so far; however, the present invention is not limited to the embodiments as they are and can be embodied by modifying a component without departing the gist of the invention in the implementation stage. Moreover, various inventions can be formed by appropriately combining a plurality of components disclosed in the embodiments. For example, some of the components may be removed from all the components represented in the embodiments. Furthermore, components in different embodiments may be combined as necessary.

Programs to be executed by the light source drive control device 103 according to the embodiment may be configured to be provided by being recorded in a computer-readable recording medium such as a compact disk read only memory (CD-ROM), a flexible disk (FD), a compact disk recordable (CD-R), a digital versatile disk (DVD), and a Universal Serial Bus (USB) in an installable or executable file format, or may be configured to be provided or distributed via a network such as the Internet. Moreover, various programs may be configured to be provided by being previously incorporated in a ROM or the like.

The configurations of the light source drive control device 103 and the image processing device according to the present embodiment are only examples, and therefore, it goes without saying that there are various configuration examples according to applications and purposes.

According to an embodiment, it is possible to clearly reproduce thin lines and characters of small size.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light source drive control device comprising:
circuitry configured to
generate line-thinned image data having been subjected to line thinning processing for thinning an edge pixel in image data by a first pixel width,
set a second pixel width of an edge in the line-thinned image data such that a ratio between the first pixel width and the second pixel width is constant,
generate intensity information including a first intensity at which a pixel not included in the set second pixel width is exposed and a second intensity at which a pixel included in the second pixel width is exposed and which is higher than the first intensity,
generate a light source modulation signal for controlling light emission of a light source according to the line-thinned image data and a drive current switching signal based on the intensity information,
switch drive current data for setting the first intensity or the second intensity and to be applied to a light source based on the drive current switching signal and output the drive current data,
drive a light source based on the light source modulation signal and the drive current data, and
control printing of the line-thinned image data, wherein
the circuitry is configured to set the ratio between the first pixel width and the second pixel width according to a proportion of the second intensity to the first intensity such that, when the second intensity is 2 times the first intensity, the ratio between the first pixel width and the second pixel width is 1 to 1.

2. The light source drive control device according to claim 1, wherein the circuitry is configured to generate the intensity information such that a total amount of light to which all pixels of the image data before the line thinning processing is performed are exposed at the first intensity is equal to a sum of a total amount of light to which all pixels not included in the second pixel width are exposed at the first intensity and a total amount of light to which all pixels included in the second pixel width are exposed at the second intensity.

3. The light source drive control device according to claim 1, wherein the second intensity is in a range from 1.5 times to 2 times the first intensity.

4. The light source drive control device according to claim 1, wherein, when the second intensity is 1.5 times the first intensity, the ratio between the first pixel width and the second pixel width is 1 to 2.

5. The light source drive control device according to claim 1, wherein the second intensity has a plurality of intensity levels.

6. The light source drive control device according to claim 1, wherein a ratio between a drive current used to drive the light source to emit light at the first intensity and a drive current used to drive the light source to emit light at the second intensity is in a range from 1 to 1.5 to 1 to 2.

7. The light source drive control device according to claim 1, wherein the light source is a vertical-cavity surface-emitting laser.

8. The light source drive control device according to claim 1, wherein the circuitry is configured to sequentially select a target pixel from the input image data at a first resolution, convert the image data at the first resolution into image data at a second resolution higher than the first resolution for each target pixel, and generate the line-thinned image data having been subjected to the line thinning processing.

9. An image forming apparatus comprising:
the light source drive control device according to claim 1.

10. A light source drive control method comprising:
generating line-thinned image data having been subjected to line thinning processing for thinning an edge pixel in image data by a first pixel width;
setting a second pixel width of an edge in the line-thinned image data such that a ratio between the first pixel width and the second pixel width is constant;
generating intensity information including a first intensity at which a pixel not included in the set second pixel width is exposed and a second intensity at which a pixel included in the second pixel width is exposed and which is higher than the first intensity;
generating strong exposure data for generating a light source modulation signal for controlling light emission of a light source according to the line-thinned image data and a drive current switching signal based on the intensity information;
switching drive current data for setting the first intensity or the second intensity and to be applied to a light source based on the drive current switching signal and outputting the drive current data;
driving a light source based on the light source modulation signal and the drive current data; and
controlling printing of the line-thinned image data, wherein
the setting sets the ratio between the first pixel width and the second pixel width according to a proportion of the second intensity to the first intensity such that, when the second intensity is 2 times the first intensity, the ratio between the first pixel width and the second pixel width is 1 to 1.

11. A computer program product comprising a non-transitory computer-readable medium containing an information processing program, the program causing a computer of a light source drive control device to perform:
generating line-thinned image data having been subjected to line thinning processing for thinning an edge pixel in image data by a first pixel width;
setting a second pixel width of an edge in the line-thinned image data such that a ratio between the first pixel width and the second pixel width is constant;
generating intensity information including a first intensity at which a pixel not included in the set second pixel width is exposed and a second intensity at which a pixel included in the second pixel width is exposed and which is higher than the first intensity;
generating strong exposure data for generating a light source modulation signal for controlling light emission of a light source according to the line-thinned image data and a drive current switching signal based on the intensity information;
switching drive current data for setting the first intensity or the second intensity and to be applied to a light source based on the drive current switching signal and outputting the drive current data; and
driving a light source based on the light source modulation signal and the drive current data; and
controlling printing of the line-thinned image data, wherein
the setting sets the ratio between the first pixel width and the second pixel width according to a proportion of the second intensity to the First intensity such that, when the second intensity is 2 times the first intensity, the ratio between the first pixel width and the second pixel width is 1 to 1.

* * * * *